United States Patent
Tanaka et al.

(10) Patent No.: US 7,865,046 B2
(45) Date of Patent: Jan. 4, 2011

(54) OPTICAL TRANSMISSION MODULE, CONNECTING PART, AND ELECTRONIC DEVICE HAVING OPTICAL TRANSMISSION MODULE

(75) Inventors: Junichi Tanaka, Nara (JP); Akihiko Sano, Uji (JP); Toshiaki Okuno, Nara (JP); Yoshihisa Ishida, Otsu (JP); Akira Enami, Nara (JP); Hiroshi Sameshima, Nara (JP); Naru Yasuda, Uji (JP); Hayami Hosokawa, Kyoto (JP)

(73) Assignee: OMRON Corporation, Kyoto-shi, Kyoto (JP)

( * ) Notice: Subject to any disclaimer, the term of this patent is extended or adjusted under 35 U.S.C. 154(b) by 0 days.

(21) Appl. No.: 12/296,516

(22) PCT Filed: Apr. 13, 2007

(86) PCT No.: PCT/JP2007/058145

§ 371 (c)(1),
(2), (4) Date: Oct. 8, 2008

(87) PCT Pub. No.: WO2007/119814

PCT Pub. Date: Oct. 25, 2007

(65) Prior Publication Data

US 2009/0175579 A1 Jul. 9, 2009

(30) Foreign Application Priority Data

Apr. 14, 2006 (JP) ............................. 2006-112774

(51) Int. Cl.
*G02B 6/30* (2006.01)
*G02B 6/36* (2006.01)

(52) U.S. Cl. .......................................... 385/36; 385/30

(58) Field of Classification Search .................. 385/30, 385/36
See application file for complete search history.

(56) References Cited

U.S. PATENT DOCUMENTS 6,272,276 B1    8/2001 Potteiger (Continued)

FOREIGN PATENT DOCUMENTS

CN    2365786 Y    2/2000

(Continued)

OTHER PUBLICATIONS

JP 2006-042307, Sep. 2, 2006, filed on Aug. 3, 2005, Korenaga et al., pp. 1-61.*

(Continued)

*Primary Examiner*—K. Cyrus Kianni
(74) *Attorney, Agent, or Firm*—Osha Liang LLP

(57) ABSTRACT

A connection member electrically connects an optical element configured to convert an electric signal to an optical signal or to convert an optical signal to an electric signal, a first substrate including an incident/releasing port of an optical transmission path for an optical signal at least one end portion thereof, and a second substrate to each other. The optical transmission path is optically coupled with the optical element to transmit the optical the connection. The connection member includes a connection unit connected to the second substrate and a holding unit having elasticity and holding the first substrate. The holding unit is provided with an electrode at a connecting position to the first substrate, and the holding unit holds the first substrate by connecting the first substrate to the electrode.

5 Claims, 19 Drawing Sheets

U.S. PATENT DOCUMENTS

| | | | |
|---|---|---|---|
| 6,535,663 B1* | 3/2003 | Chertkow | 385/18 |
| 6,985,659 B2* | 1/2006 | Torigoe et al. | 385/114 |
| 7,097,366 B2* | 8/2006 | Aoki et al. | 385/92 |
| 7,183,633 B2* | 2/2007 | Daneman et al. | 257/678 |
| 7,441,447 B2* | 10/2008 | Degertekin et al. | 73/105 |
| 2002/0109074 A1* | 8/2002 | Uchida | 250/214.1 |
| 2004/0033008 A1* | 2/2004 | Mikawa et al. | 385/14 |
| 2004/0120626 A1* | 6/2004 | Kornrumpf et al. | 385/2 |
| 2004/0264882 A1* | 12/2004 | Torigoe et al. | 385/88 |
| 2005/0069274 A1* | 3/2005 | Aoki et al. | 385/129 |
| 2005/0224946 A1* | 10/2005 | Dutta | 257/686 |
| 2006/0067608 A1* | 3/2006 | Kobayashi et al. | 385/14 |
| 2006/0097364 A1* | 5/2006 | Shinojima | 257/666 |
| 2006/0222284 A1* | 10/2006 | Mohammed | 385/14 |
| 2007/0003184 A1* | 1/2007 | Takahara et al. | 385/14 |
| 2007/0194225 A1* | 8/2007 | Zorn | 250/306 |
| 2008/0075405 A1* | 3/2008 | Wang et al. | 385/14 |
| 2009/0194768 A1* | 8/2009 | Leedy | 257/48 |

FOREIGN PATENT DOCUMENTS

| | | |
|---|---|---|
| JP | 2-24810 | 2/1990 |
| JP | 6-82659 | 3/1994 |
| JP | 11-68254 | 3/1999 |
| JP | 2001-194555 | 7/2001 |
| JP | 2001-337249 | 12/2001 |
| JP | 2005-216530 | 8/2005 |

OTHER PUBLICATIONS

International Search Report PCT/ISA/210 (Japanese only) mailed Jun. 19, 2007 (5 pages).
Written Opinion of ISA (Japanese Only) mailed Jun. 19, 2007 (4 pages).
Patent Abstracts of Japan 2005-321560 dated Nov. 17, 2005 (full English translation) (30 pages).
Patent Abstracts of Japan 2006-042307 dated Feb. 9, 2006 (full English translation) (61 pages).
Patent Abstracts of Japan 2001-194555 dated Jul. 19, 2001 (1 page).
Patent Abstracts of Japan 11-068254 dated Mar. 9, 1999 (1 page).
Patent Abstracts of Japan 2005-216530 dated Aug. 11, 2005 (1 page).
Patent Abstracts of Japan 06-082659 dated Mar. 25, 1994 (1 page).
Patent Abstracts of Japan 2001-337249 dated Dec. 7, 2001 (1 page).
Chinese First Office Action issued in related patent application No. 2007800131472, mailed Feb. 5, 2010, and English translation thereof, 12 pages.
English Abstract for CN2365786Y, Publication Date: Feb. 23, 2000, 1 page.

* cited by examiner

OPTICAL TRANSMISSION MODULE, CONNECTING PART, AND ELECTRONIC DEVICE HAVING OPTICAL TRANSMISSION MODULE

TECHNICAL FIELD

The present invention relates to an optical communication cable module, and more particularly concerns a connection structure of an optical transmission module to a substrate.

BACKGROUND ART

In recent years, there have been strong demands for a data transmission module capable of high-speed data communication with a large capacity, which is superior in space property and noise resistant property, and can be mounted on small-size, thin consumer appliances. Examples of the data communication in consumer appliances include data communication between a display and a mother board in a notebook computer and data communication between a display and a mother board in a PDA (Personal Digital Assistant). In recent years, in an attempt to achieve high-speed data communication with a large capacity in these small-size, thin consumer appliances, since data communication by the use of electric signals has limitations in the communication speed and the module space, data communication by the use of optical signals has been utilized. In the data communication by the use of optical signals, an optical transmission module that converts an electric signal to an optical signal, and transmits the optical signal has been used. With this arrangement, optical transmission among substrates in the apparatus can be executed.

The following description will briefly discuss the system of data communication utilizing the optical communication module. Here, in order to execute data communication inside an apparatus, the optical transmission module is supposed to have a structure in which one end of the optical transmission module is mounted on a substrate A, with the other end of the optical transmission module being mounted on a substrate B. Moreover, the following explanation will be given by exemplifying a transmission path for transmitting an optical signal as an optical waveguide.

First, an electric signal, transmitted through the substrate A, is inputted to a photoelectric conversion element (light-receiving/emitting element, optical element) a on the transmission side where it is converted to an optical signal. The photoelectric conversion element a transmits the optical signal thus converted toward an optical waveguide (optical transmission path). The optical signal, transmitted from the photoelectric conversion element a, is made incident on an incident port of an optical signal in the optical waveguide, and propagated through the waveguide. Then, the optical signal is released from a releasing port of an optical signal in the optical waveguide, and received by a photoelectric conversion element (light-receiving/emitting element, optical element) b on the light-receiving side. The optical signal, received by the photoelectric conversion element b, is converted to an electric signal, and the resulting electric signal is transmitted through the substrate B.

By electrically connecting the optical transmission module to the substrate in this manner, data communication is executed in the apparatus.

Here, conventionally, various methods for connecting an optical transmission module to a substrate have been proposed. For example, an optical transmission module described in Patent Document 1 is provided with electrode pins, and designed so that the electrode pins are secured to the substrate by soldering. FIG. 34 is a side view that shows a schematic structure of an optical transmission module 100 described in Patent Document 1. As shown in this Figure, a package 104 on which a sub-substrate 103 having an optical waveguide 101 and a light-receiving/emitting element 102 assembled therein has been mounted is provided with an electrode pin 105 that allows electrical connection to the substrate 106. Thus, since the optical communication module 100 is secured onto the substrate 106 through the electrode pin 105, data communication is available between apparatuses (not shown) by utilizing optical transmission.

Moreover, Patent Document 2 has described a structure in which an optical transmission module is connected to a substrate by using an electric connector. FIG. 35 is a side view that shows a schematic structure of an optical transmission module 200 described in Patent Document 2. As shown in this Figure, a sub-substrate 203 on which an optical waveguide 201 and a light-receiving/emitting element 202 have been mounted is provided with an electric connector 204 that allows electrical connection to a substrate 205. With this arrangement, since the optical transmission module 200 can be secured to the substrate 205 through the electric connector 204, data communication is available between apparatuses (not shown) by utilizing optical transmission, in the same manner as in Patent Document 1.

Patent Document 1: Japanese Patent Application Laid-Open "JP-A No. 2005-321560 (published on Nov. 17, 2005)"

Patent Document 2: Japanese Patent Application Laid-Open "JP-A No. 2006-42307 (published on Feb. 9, 2006)"

Here, in order to transmit an optical signal by using an optical waveguide, the incident/releasing port of an optical signal in the optical waveguide and the light-receiving/emitting element need to be properly positioned and optically coupled with each other. As described above, the light-receiving/emitting element is an element that converts an electric signal transmitted thereto from an external device through the substrate to an optical signal and transmits the optical signal, and also receives an optical signal and converts it to an electric signal. Here, in order to achieve stable data transmission, it is necessary to maintain constant the distance between the incident/releasing port of an optical signal in the light-receiving/emitting element and the incident/releasing port of an optical signal in the optical waveguide, as well as the positional relationship between the two ports.

However, the above-mentioned conventional structure has the following problems.

That is, in the structure described in Patent Document 1, the optical transmission module 100 and the substrate 106 are firmly secured to each other by soldering; therefore, for example, in a case where, upon securing the two members by soldering, a warp or the like occurs in the sub-substrate 103 or the package 104 of the optical transmission module 100, the optical transmission module 100 is secured in a deformed state, as it is. Moreover, even in a case where the optical transmission module 100 and the substrate 106 are connected to each other without any problems, since the optical transmission module 100 and the substrate 106 are brought into a firmly secured state by soldering, a deformation occurring in the substrate 106 due to an external force or the like applied thereto might be transferred to the optical transmission module 100. Moreover, since the above-mentioned structure uses solder, the optical waveguide might be deformed or damaged by influences of reflow heat.

In this manner, in a case where a deformation occurs in the sub-substrate 103 on which the optical waveguide 101 and the light-receiving/emitting element 102 are mounted, the package 104 or the optical waveguide 101 itself, since the distance between the incident/releasing port of an optical signal in the light-receiving/emitting element 102 and the incident/releasing port of an optical signal in the optical waveguide 101, as well as the positional relationship between the two ports, is changed, the optical coupling efficiency is varied to cause a problem of failure in transmitting data stably.

In particular, in a case of an optical waveguide having high flexibility, since a polymer waveguide is used in most cases, the waveguide is more susceptible to influences by heat. For this reason, it becomes very difficult to carry out data transmission in a stable manner.

Moreover, in the structure described in Patent Document 2, since an optical transmission module 200 is connected to a substrate 205 through an electric connector 204, a space used for mounting the electric connector 204 is required to cause a problem in that the entire module becomes bulky. Moreover, in a case of the connection using the electric connector 204, when the substrate 205 receives a stress in a rotation direction θ around an insertion direction (Z-axis) of the connector, the connection unit of the electric connector 204 in the optical transmission module 200 also receives the same stress, and the connection unit consequently tends to be damaged. As a result, coming off of the electric connector 204 or the like tends to occur, failing to carry out normal electrical communication to cause adverse effects in the optical transmission.

Here, specific examples of the method for connecting an optical transmission path include a method using a ferrule as a holding member and a directly pasting method onto an optical element. However, the method using the ferrule requires a space for connectors, with the result that the entire module becomes bulky. Moreover, when applied to a small-size apparatus, this structure is more susceptible to influences from vibration and impact, and deviations in the optical axis tend to occur, failing to carry out data transmission in a stable manner. In contrast, the method for directly pasting an optical transmission path onto an optical element causes a deformation of the substrate to be transferred to the optical transmission path, with the result that deviations in the optical axis tend to occur, failing to carry out data transmission in a stable manner.

In view of the above-mentioned various problems, the present invention has been devised, and its objective is to provide an optical transmission module having a small size that is capable of carrying out stable data transmission, a connection member and an electronic apparatus equipped with such an optical transmission module.

DISCLOSURE OF THE INVENTION

In order to solve the above-mentioned problems, a connection member in accordance with the present invention, which electrically connects a first substrate on which an optical element that converts an electric signal to an optical signal or converts an optical signal to an electric signal and at least one end portion including an incident/releasing port for an optical signal of an optical transmission path that is optically coupled with the optical element to transmit the optical signal are mounted, and a second substrate to each other, is characterized by including a holding unit having elasticity, which holds the first substrate, and a connection unit that is connected to the second substrate.

Here, the optical transmission path is a cable used for transmitting an optical signal, and specific examples thereof include an optical waveguide and an optical fiber.

Moreover, the material used for the holding unit includes any elastic material as long as it can absorb vibration, impact or the like, and specific examples thereof include rubber, springs, adhesive sheets and resin.

In accordance with the above-mentioned structure, the first substrate is connected to the second substrate through the connection member.

With this arrangement, since the first substrate is held by the holding unit having elasticity, it is allowed to move relative to the second substrate. For this reason, even in a case where a deformation such as a warp occurs in the second substrate due to influences from, for example, an external force or heat, since the amount of deformation is absorbed by the holding unit, no deformation occurs in the first substrate.

In order to achieve stable data transmission, it is necessary to maintain constant the distance between the incident/releasing portion for an optical signal of the optical element and the incident/releasing port for an optical signal of the optical waveguide, that is, the positional relationship between the optical element and the optical waveguide.

Conventionally, the second substrate and the first substrate have an integrally fixed structure by using solder or the like; consequently, when a deformation occurs in the second substrate, the subsequent deformation also occurs in the first substrate. For this reason, the positional relationship between the optical element mounted on the first substrate and the optical waveguide is changed to cause fluctuations in the optical coupling efficiency, resulting in a failure in transmitting data in a stable manner.

In contrast, in the structure of the present invention, even in the case where a deformation occurs in the second substrate, since the amount of deformation is absorbed by the holding unit, it is possible to prevent a deformation from occurring in the first substrate on which the optical element is mounted. In this manner, since the first substrate is made free from influences caused by the second substrate, the positional relationship between the optical element and the optical waveguide can be maintained constant. Therefore, stable data transmission is executed without fluctuations in the optical coupling efficiency.

In order to solve the above-mentioned problems, an optical transmission module in accordance with the present invention is provided with: an optical element that converts an electric signal to an optical signal or converts an optical signal to an electric signal; an optical transmission path that optically coupled with the optical element to transmit an optical signal; a first substrate that houses at least one end portion including an incident/releasing port for an optical signal in the optical transmission path and the optical element; and a second substrate to which the optical transmission module is electrically connected, and in this structure, the optical transmission module is further provided with a holding unit having elasticity, which holds the first substrate, and a connection member having a connection unit that is connected to the second substrate.

In accordance with the above-mentioned structure, the first substrate of the optical transmission module is connected to the second substrate through the connection member. Since the first substrate of the optical transmission module is held by the holding unit having elasticity, it is allowed to move relative to the second substrate. Consequently, even in the case where a deformation such as a warp occurs in the second substrate due to influences of, for example, an external force and heat, the amount of deformation can be absorbed by the holding units so that no deformation occurs in the first substrate.

In this manner, since the first substrate of the optical transmission module is made free from influences caused by the second substrate, the positional relationship between the optical element and the optical waveguide can be maintained constant. Therefore, stable data transmission is executed without fluctuations in the optical coupling efficiency.

Moreover, in accordance with the above-mentioned structure, since the optical transmission module is provided with the above-mentioned connection member, the connecting process between the optical transmission module and the second substrate can be simplified. Furthermore, since the connection member can be preliminarily attached to the first substrate, it is possible to improve the attaching precision of the connection member to the first substrate.

These and other objects, features and advantages of the invention will be made clearer by a description given below. The profit of the present invention will become apparent from the ensuring explanation taken in conjunction with the attached drawings.

BRIEF DESCRIPTIONS OF THE DRAWINGS

Figure 29A:
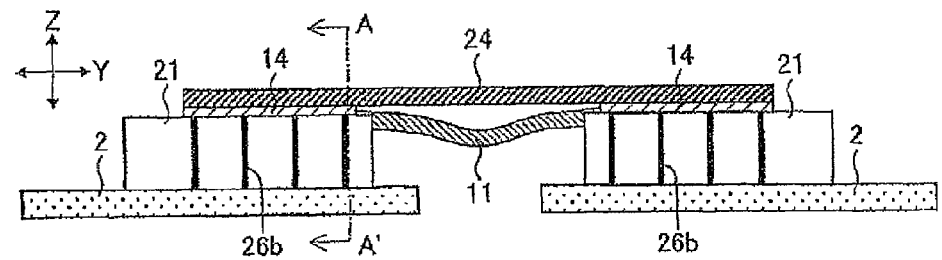
FIG. 29(a) is a view that shows a detailed structure of the optical transmission module shown in FIG. 28.
Figure 29B:
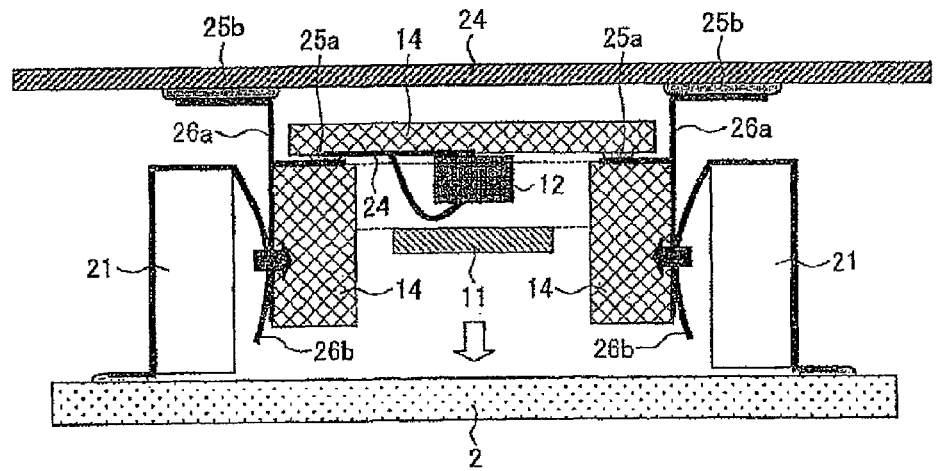

FIG. 29(b), which is an A-A' line cross-sectional view, is a view that shows a connection method between the optical transmission module and the substrate, in a case where a package is inserted between elastic holding units.

Figure 30:
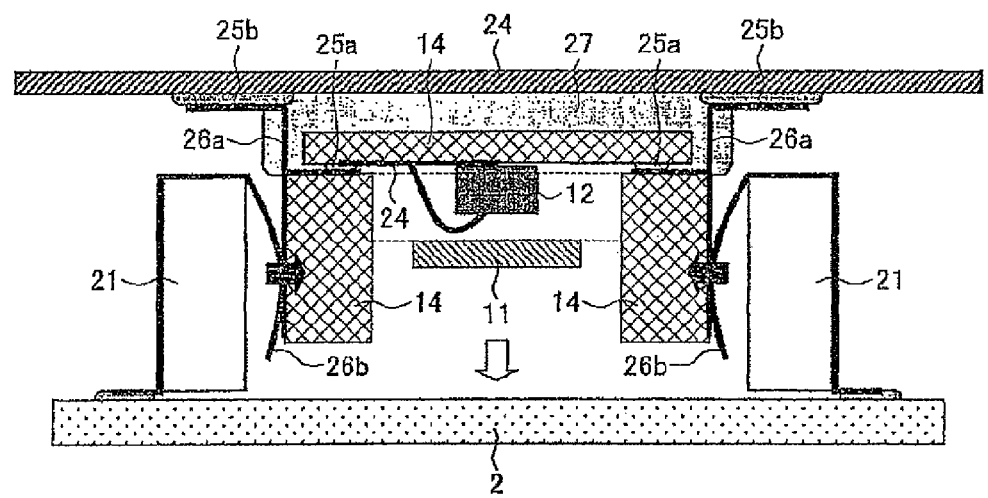

FIG. 30 is a view that shows a state in which, in the optical transmission module shown in FIG. 29(b), the gap between the third substrate and the package is filled with a resin.

Figure 31A:
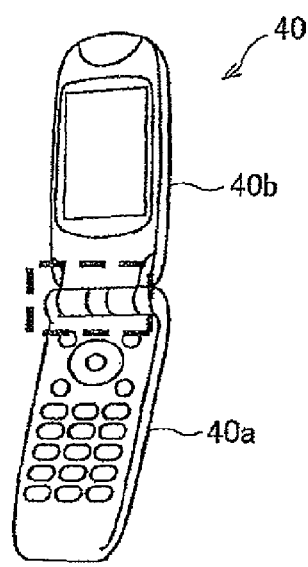

FIG. 31(a) is a perspective view that shows an external appearance of a folding-type portable telephone provided with an optical transmission module in accordance with the present embodiment.

Figure 31B:
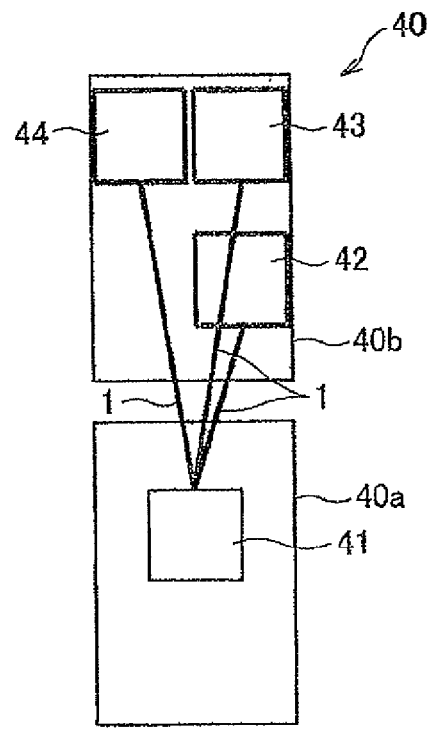

FIG. 31(b) is a block diagram that shows a portion of the folding-type portable telephone, shown in FIG. 31(a), to which the optical transmission module is applied.

Figure 31C:
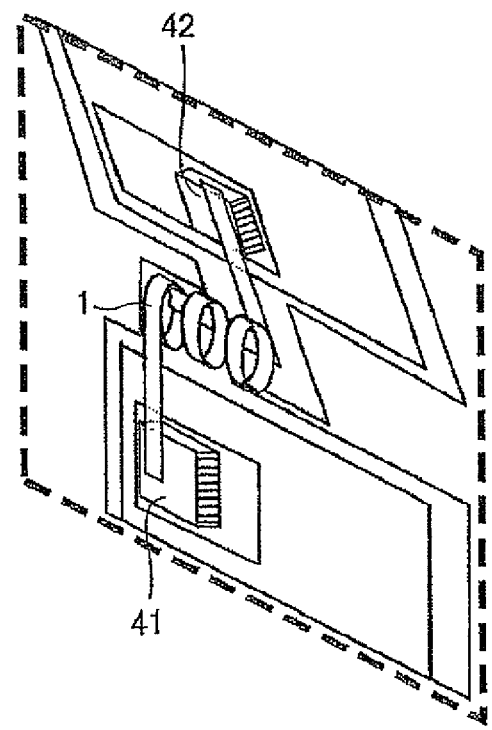

FIG. 31(c) is a perspective plan view of a hinge portion in the folding-type portable telephone shown in FIG. 31(a).

Figure 32A:
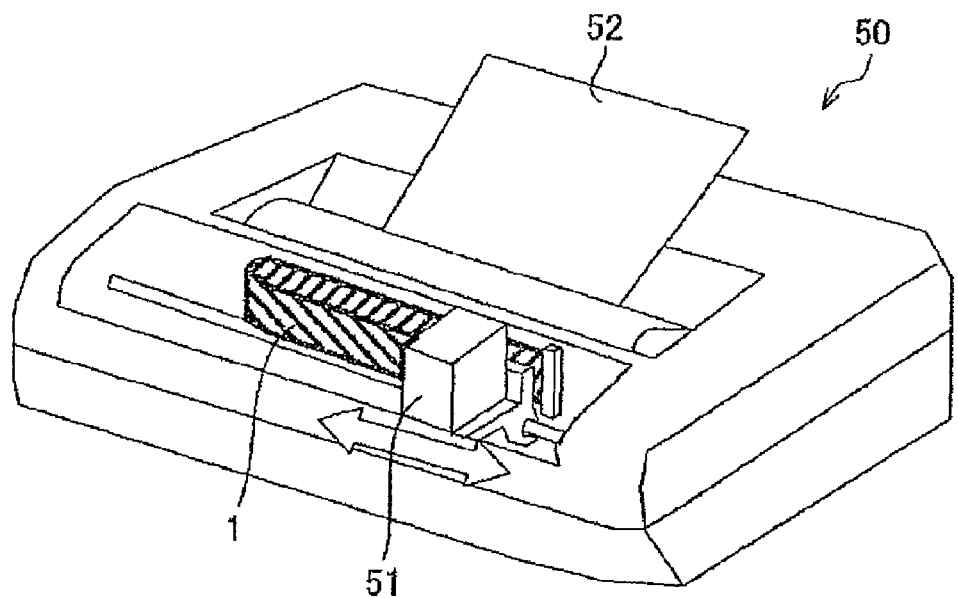

FIG. 32(a) is a perspective view that shows an external appearance of a printing apparatus provided with an optical transmission module in accordance with the present embodiment.

Figure 32B:
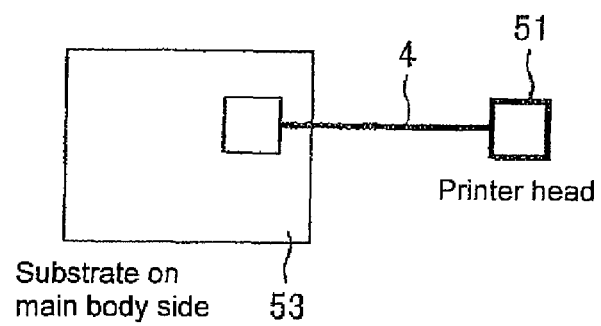

FIG. 32(b) is a block diagram that shows a main portion of the printing apparatus shown in FIG. 32(a).

Figure 32C:
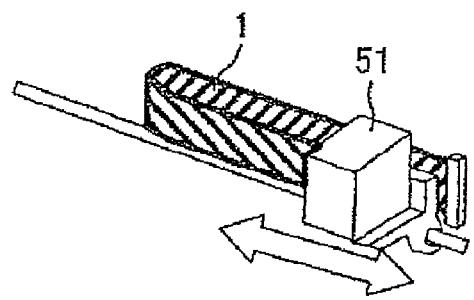

FIG. 32(c) is a perspective view that shows a curved state of the optical transmission module when a printer head is moved (driven) in the printing apparatus shown in FIG. 32(a).

Figure 32D:
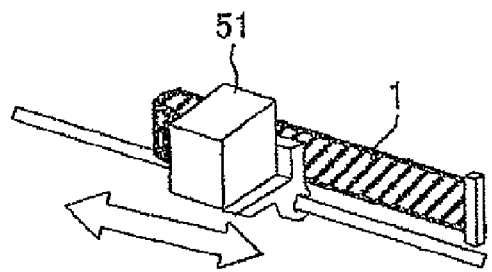

FIG. 32(d) is a perspective view that shows a curved state of the optical transmission module when a printer head is moved (driven) in the printing apparatus shown in FIG. 32(a).

Figure 33:
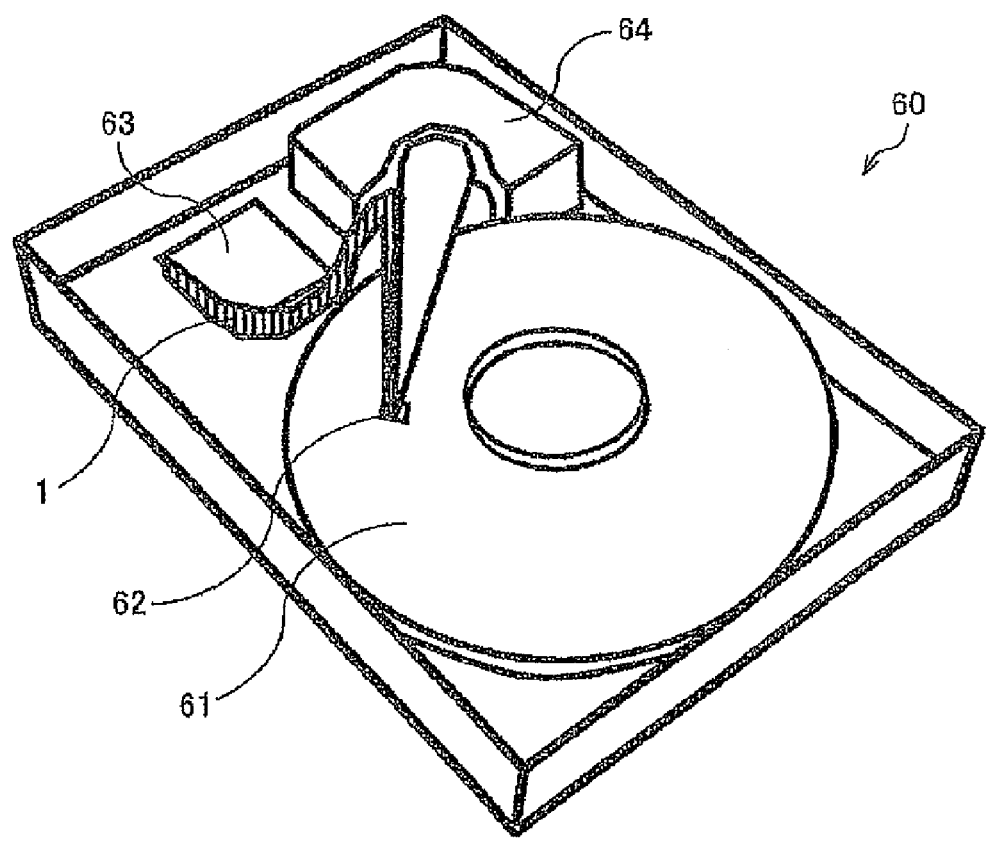

FIG. 33 is a perspective view that shows an external appearance of a hard disk recording/reproducing apparatus provided with an optical transmission module in accordance with the present embodiment.

Figure 34:
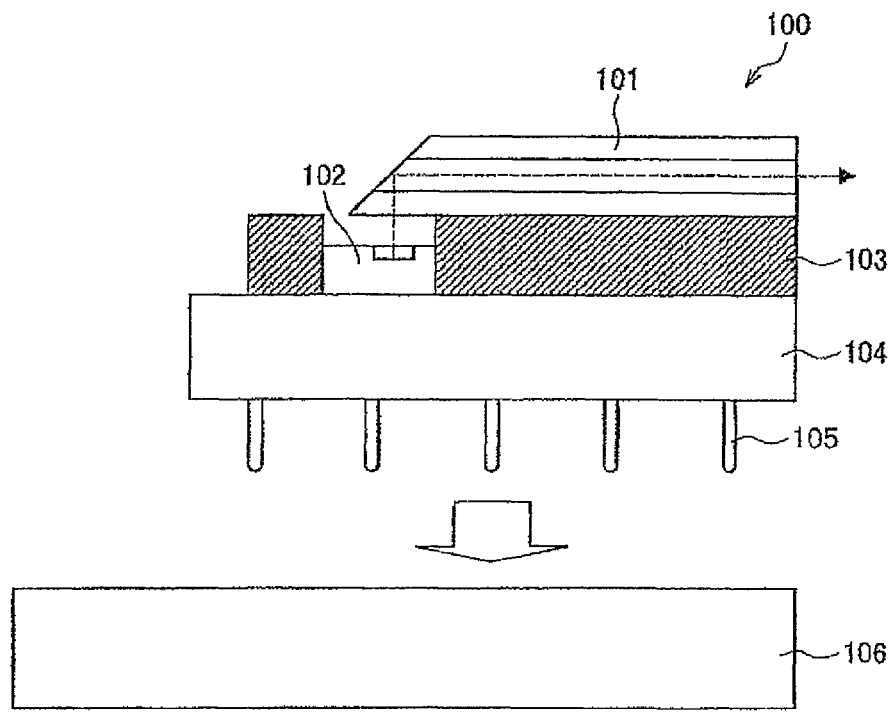

FIG. 34 is a side view that shows a connection state between a conventional optical transmission module and a substrate.

Figure 35:
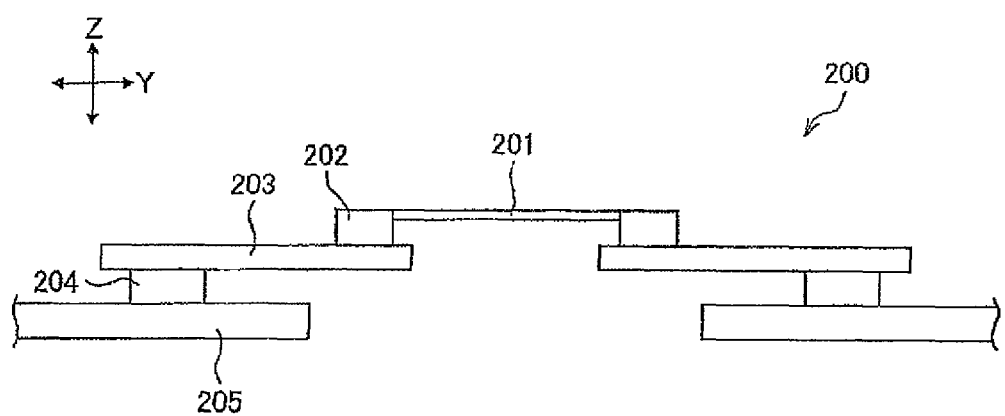

FIG. 35 is a side view that shows a connection state between a conventional optical transmission module and a substrate.

REFERENCE NUMERALS

1 Optical transmission module
2 Substrate (second substrate)
11 Optical waveguide (optical transmission path)
12 Light-receiving/emitting element (optical element)
14 Package (first substrate)
21 Elastic holding unit (connection member)
21a Pin (connection unit, electrode pin)
21b Elastic portion (holding unit)
21c Electrode

BEST MODE FOR CARRYING OUT THE INVENTION

Figure 1A:
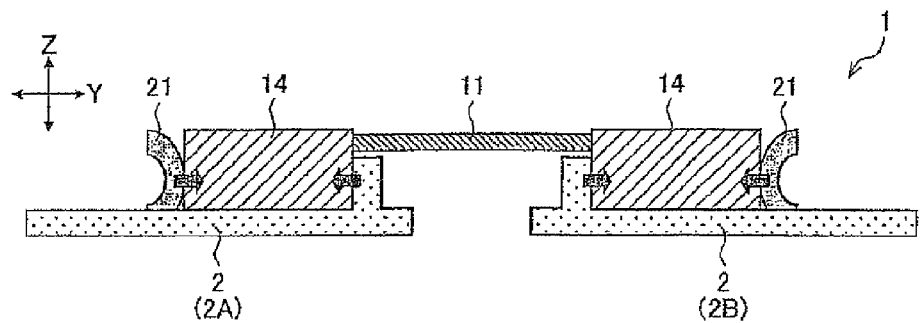
FIG. 1(a) is a side view that shows a connection state between an optical transmission module and substrates in accordance with the present embodiment.

Referring to Figures, the following description will discuss one embodiment of the present invention. FIG. 1(a) is a side view that shows a connection state between an optical transmission module 1 and a substrate 2 in accordance with the present embodiment, and FIG. 1(b) is a plan view thereof.

Figure 1B:
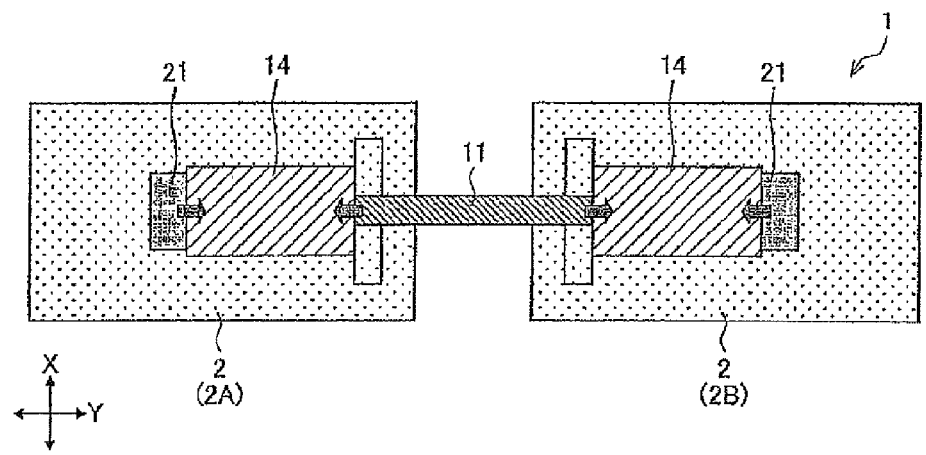
FIG. 1(b) is a plan view that shows the connection state between the optical transmission module and the substrates in accordance with the present embodiment.

First, referring to FIGS. 1(a) and 1(b), the following description will explain a system for data communication in which the optical transmission module 1 is utilized. Here, the optical transmission module 1 is supposed to have a structure in which one end of the optical transmission module 1 is mounted on a substrate 2A, with the other end of the optical transmission module 1 being mounted on a substrate 2B, so as to execute data communication inside an apparatus (not shown).

First, the optical transmission module 1 receives an electric signal transmitted through the substrate 2A. Then, the optical transmission module 1 converts the received electric signal to an optical signal, and transmits the optical signal toward the substrate 2B, and again converts it to an electric signal to be transmitted to the substrate 2B.

By electrically connecting the optical transmission module 1 and the substrate 2 with each other, data communication between the substrates in the apparatus is available. The following description will discuss structures of the optical transmission module 1 and the substrate 2 in detail. In the following description, by taking into consideration an optical transmission module to be installed in a small-size, thin apparatus, the optical transmission path is explained as an optical waveguide; however, not limited to this, the optical transmission path may be an optical fiber or the like.

First, structures of the respective parts will be explained.

(Structure of Optical Transmission Module)

Figure 2:
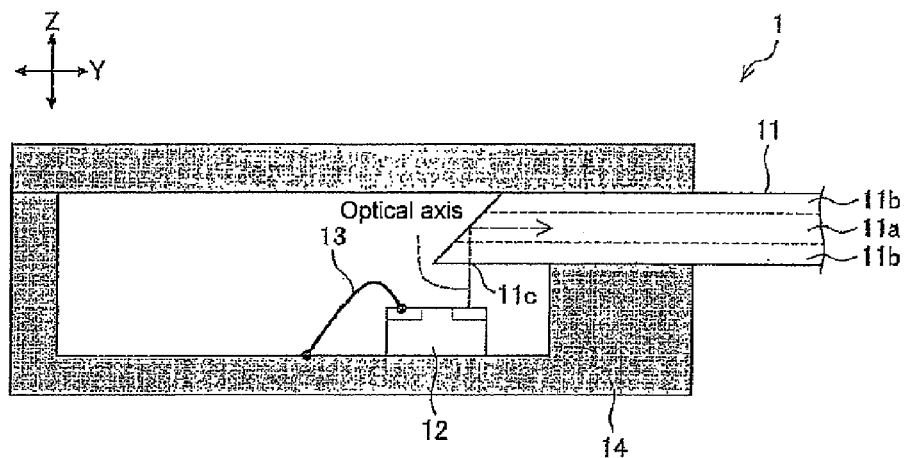
FIG. 2 is a side view that shows a schematic structure of the optical transmission module.

As shown in FIG. 2, the optical transmission module 1 is provided with an optical waveguide (optical transmission path) 11, a light-receiving/emitting element (optical element) 12, a bonding wire 13 and a package (first substrate) 14.

The optical waveguide 11 is configured by a core portion 11a having a high refractive index and a clad portion 11b having a low refractive index formed on the periphery of the core portion 11a so as to be adjacent thereto, and transmits an optical signal that has been made incident on the core portion 11a by utilizing total reflection that is repeated on the border between the core portion 11a and the clad portion 11b. Since the core portion 11a and the clad portion 11b are made from a polymer material having flexibility, the optical waveguide 11 has flexibility.

Here, the following description will briefly discuss a method for transmitting an optical signal in the optical waveguide 11.

As shown in FIG. 2, each of end faces of the optical waveguide 11 is processed into a tilt face of 45 degrees so that an optical signal, made incident on an incident/releasing port 11c of the optical waveguide 11, is reflected by one of the end faces, and its optical path is changed by 90 degrees so that it is directed into the optical waveguide 11. The optical signal, directed into the optical waveguide 11, is transmitted toward the other end face, while repeating the total reflection therein. Thus, the optical signal, reflected by the other end face, has its optical path changed by 90 degrees, and is released outward from the incident/releasing port 11c.

In the present embodiment, the angle of the end face of the optical waveguide 11 is set to 45 degrees; however, not limited to this, any structure may be used as long as it can direct an optical signal into the optical waveguide 11. Another structure may be used in which, for example, the end face of the optical waveguide 11 is processed into a right angle, with an optical signal being made incident and released on and from the end face in directions orthogonal to the end face.

The light-releasing/emitting element 12 converts an electric signal to an optical signal, or converts an optical signal to an electric signal. Here, the light-receiving/emitting element 12 is an element of a surface light-receiving/emitting type, and designed to emit or receive an optical signal from a face on the side opposite to a mounting face corresponding to a bottom plate of a package 14, which will be described later is mounted.

The bonding wire 13 is used for connecting the light-receiving/emitting element 12 to an electric wire (not shown) installed on the package 14, which will be described later, so as to transmit an electric signal.

The package 14 is formed into a concave shape, with four sides being surrounded by walls rising from the bottom plate, and its upper opening is closed by a lid. End portions of the optical waveguide 11, the light-receiving/emitting element 12 and the bonding wire 13 are installed in the package 14. Moreover, the package 14 is provided with an electrode (not shown) that is made in contact with the electric wiring (not shown) and an external device, and designed so that, when made in electrically contact with the external device, for example, a substrate, an electric signal is transmitted to the light-receiving/emitting element 12 through the bonding wire 13. Here, as the material used for the package 14, selection may be made from various materials, such as epoxy, ceramics, glass and plastic materials. Moreover, various elements, such as a driving circuit used for driving the light-receiving/emitting element 12, ICs, and driving circuits for ICs, may be assembled in the package 14.

Here, the package 14 in the present embodiment has a structure with a concave shape so as to house the end portions of the optical waveguide 11 the light-receiving/emitting element 12 and the like, as described above, however, not limited to this structure, for example, this may be formed as a flat-plate-shaped substrate on which the end portions of the optical waveguide 11, the light-receiving/emitting element 12 and the like are mounted.

Figure 3:
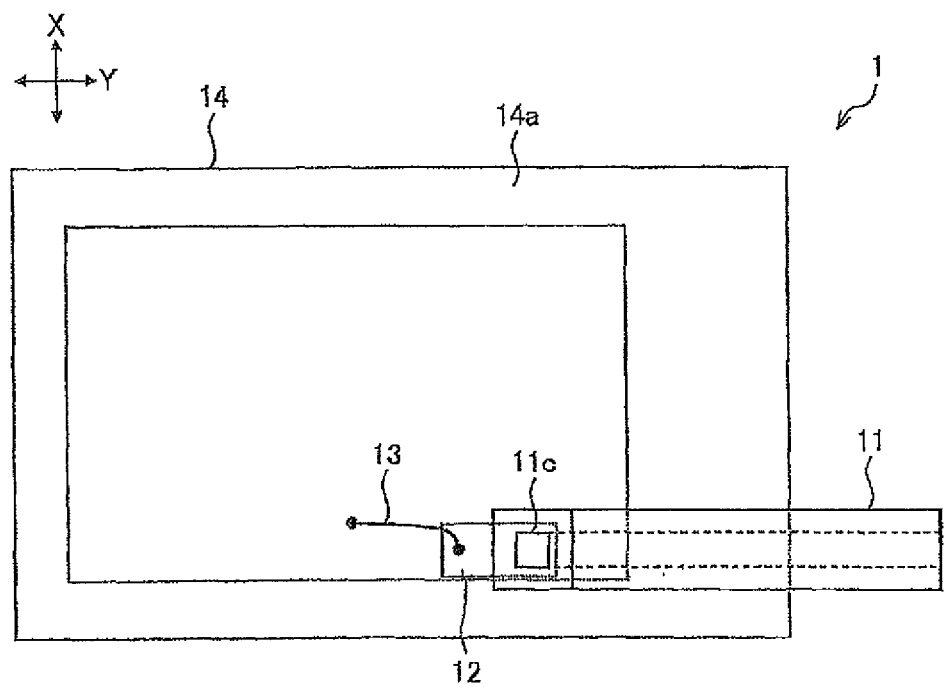
FIG. 3 is a plan view that shows a schematic structure of the optical transmission module.

Next, referring to FIGS. 2 and 3, the following description will discuss one example of a method for manufacturing the optical transmission module 1 configured by the above-mentioned parts. Here, in FIGS. 2 and 3, an axis that is in parallel with a longitudinal direction of the optical waveguide 11 on the opening face 14a of the package 14 is defined as a Y-axis, an axis that is orthogonal to the Y-axis is defined as an X-axis, a coordinate plane is defined as an X-Y plane, and an axis orthogonal to the X-Y plane is defined as a Z-axis.

First, a light-receiving/emitting element 12, a bonding wire 13, an electric wire (not shown), an electric connection unit (not shown) and an electrode (not shown) are preliminarily assembled onto a package 14 secured by a jig or the like by using a method, such as a soldering method. Next, while the optical waveguide 11 is held by using an air chuck or the like, the light-receiving/emitting element 12 and the optical waveguide 11 are position-adjusted by using an image recognition device (not shown) placed above (Z-axis direction) the package 14. The optical waveguide 11 is secured onto an opening face 14a of the package 14 by using a method such as bonding, at a position on the tilt end face of the optical waveguide 11 where a projection portion (incident/releasing port) 11c of the core portion and the incident/releasing portion of the light-receiving/emitting element 12 are made coincident with each other.

In accordance with the optical transmission module 1 manufactured through the above-mentioned method, since the peripheral portion of the incident/releasing port 11c of the optical waveguide 11 can be supported, the distance between the incident/releasing portion for an optical signal of the light-receiving/emitting element 12 and the incident/releasing port 11c for an optical signal of the optical waveguide 11, as well as the positional relationship between the two ports, can be maintained constant. Therefore, by suppressing fluctuations in the optical coupling efficiency between the light-receiving/emitting element 12 and the optical waveguide 11, it is possible to provide a stable transmission of data signal.

Here, the securing method for the optical waveguide 11 is not particularly limited, and another structure may be used, as long as the distance between the light-receiving/emitting element 12 and the incident/releasing port 11c for an optical signal of the optical waveguide 11, as well as the positional relationship between the two ports, can be maintained constant. For example, another structure in which a supporting member for supporting the end portion of the optical waveguide 11 is assembled in the package 14 may be used.

(Structure of Substrate)

Figure 4A:
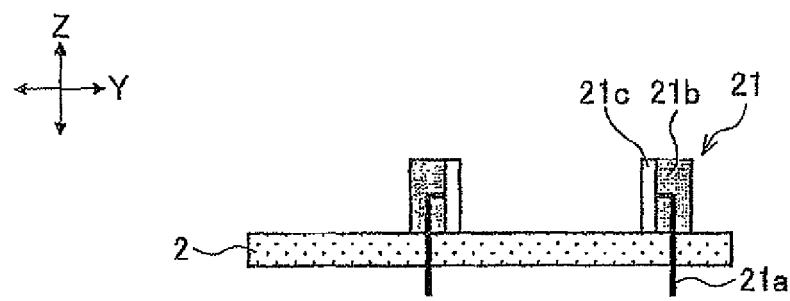
FIG. 4(a) is a side view that shows a schematic structure of the substrate.
Figure 4B:
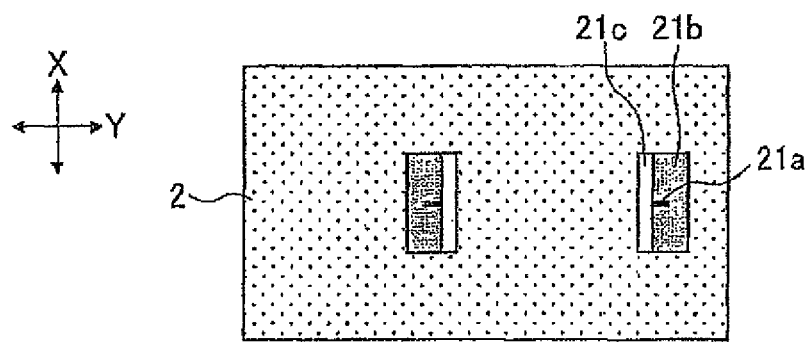
FIG. 4(b) is a plan view that shows the schematic structure of the substrate shown in FIG. 4(a).

FIG. 4(a) is a side view that shows a schematic structure of a substrate (second substrate) 2, and FIG. 4(b) is a plan view thereof. The substrate 2 is a general substrate to be connected to an apparatus (not shown), and various elements are mounted thereon, with electric signals being transmitted among the elements. Moreover, an elastic holding unit (connecting member) 21, used for holding the package 14 of the optical transmission module 1, is formed on the substrate 2.

The elastic holding unit 21 is provided with a pin (connecting portion, electrode pin) 21a to be inserted into a through hole of the substrate 2, an elastic portion 21b for holding the optical transmission module 1, and an electrode 21c that is attached to the elastic portion 21b so as to be electrically connected to the pin 21a. Here, the elastic portion 21b is made from an elastic material capable of absorbing vibrations, impacts and the like, and specific examples of the materials include rubber, a spring, an adhesive sheet, a resin and the like. Moreover, the electrode 21c is made in contact with an electrode placed on the package 14 of the optical transmission module 1, and electrically connected to the light-receiving/emitting element 12. The elastic holding unit 21 is electrically connected and secured to the substrate 2 by using solder, electrical connectors (connecting portions) or the like.

Next, referring to FIGS. 1(a) and 1(b) as well as FIGS. 4(a) and (b), the following description will discuss a method for communication of electric signals on the optical transmission module 1 and the substrate 2. The explanation is given by exemplifying a structure in which a driving IC is mounted on a substrate 2.

The driving IC mounted on one of the substrates 2A acquires a command from a control unit (not shown), and releases an electric signal. The electric signal thus released is transmitted through the substrate 2A, and directed to the electrode 21c through the pin 21a of the elastic holding unit 21 so as to transmit data to the other substrate 2B. The electric signal is then inputted to the light-receiving/emitting element (light-emitting element) 12 through the package 14 that is made in contact with the electrode 21c. As described earlier, the electric signal, inputted to the light-receiving/emitting element 12, is converted into an optical signal, and transmitted through the optical waveguide 11. The optical signal, transmitted through the optical waveguide 11, is received by the light-receiving/emitting element (light-receiving element) 12, and again converted to an electric signal. The electric signal, thus converted, is directed to the electrode 21c of the other elastic holding unit 21 that is made in contact with the package 14 through the package 14, and inputted to, for example, an amplifier or the like (not shown) that is mounted on the other substrate 2B through the pin 21a so that it is amplified to a desired output.

As described above, by electrically connecting the optical transmission module 1 to the substrate 2 through the elastic holding unit 21, it is possible to carry out data communication by utilizing optical transmission.

The following description will discuss the structure of a connecting portion of the optical transmission module 1 and the substrate 2. In the following description, a coordinate plane in parallel with a surface of the substrate 2 on which the elastic holding unit 21 is mounted is defined as an X-Y plane, an axis that is orthogonal to the X-Y plane is defined as a Z-axis, an axis in parallel with the longitudinal direction of the optical waveguide 11 is defined as a Y-axis and an axis that is orthogonal to the Y-axis is defined as an X-axis.

Figure 5A:
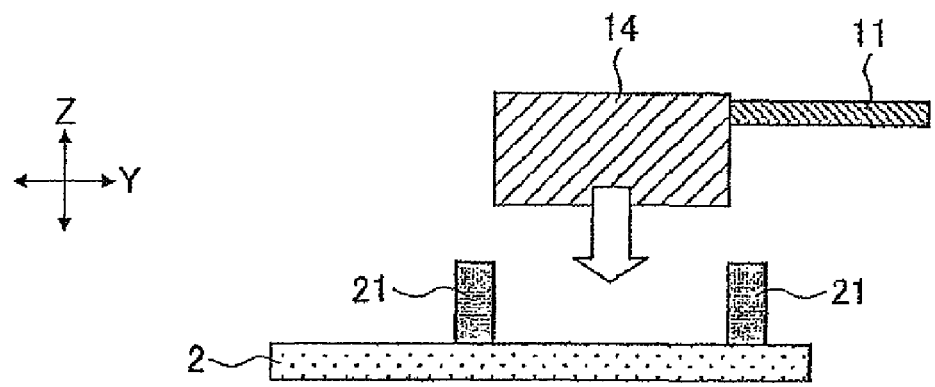
FIG. 5(a) is a side view that shows a connection method between the optical transmission module and the substrate.
Figure 5B:
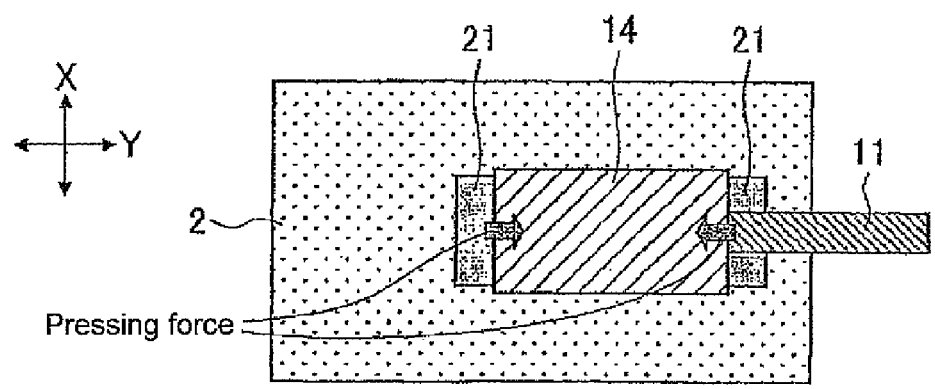
FIG. 5(b) is a plan view that shows a connection state between the optical transmission module and the substrate shown in FIG. 5(a).

FIG. 5(a) is a side view that shows a connection method in which the optical transmission module 1 is fitted to the substrate 2 from above (Z-axis direction) the substrate 2, and FIG. 5(b) is a plan view that shows a connection state between the optical transmission module 1 and the substrate 2.

As shown in FIGS. 5(a) and 5(b), a pair of the elastic holding units 21 opposing to each other in a Y-axis direction are formed on the substrate 2 by soldering or the like. Moreover, electrodes 21c that are electrically connected to the package 14 are formed on the opposing faces of the paired elastic holding units 21. Here, the electrode 21c may be attached to either one of the paired elastic holding units 21. Moreover, the distance between the paired elastic holding units 21 is preferably made shorter than the length in the Y-axis direction of the package 14 of the optical transmission module 1. That is, the distance is preferably adjusted to such a degree as to allow the package 14, held between the paired elastic holding units 21, to move toward the + side or − side in the Y-axis direction.

In the above-mentioned structure, the optical transmission module 1, inserted between the paired elastic holding units 21 from the Z-axis direction as shown in FIG. 5(a), is subjected to pressing forces in mutually different directions in the Y-axis direction from the paired elastic holding units 21. With this arrangement, the optical transmission module 1 can be held in an electrically connected state with the substrate 2. Moreover, since the optical transmission module 1 is connected to the substrate 2 through the elastic molding units 21, it is allowed to move independently from the substrate 2 in its held state between the paired elastic holding units 21.

For this reason, even in a case where a deformation or the like occurs in the substrate 2, the influences thereof can be absorbed by the elastic holding units 21, and are not given to the optical transmission module 1. More specifically, for example, when a warp occurs in the substrate 2 in a Z-axis direction (upward) due to an external force and heat, the elastic holding units 21 are deformed in mutually departing directions of the elastic holding units 21 in the Y-axis direction. However, these deformations only give influences to the pressing forces to be applied to the optical transmission module 1 from the elastic holding units 21, and no influences are given to the shape of the package 14 of the optical transmission module 1. With this arrangement, even when a deformation occurs in the substrate 2 on which the optical transmission module 1 is assembled, the deformation of the optical transmission module 1 can be prevented; thus, the distance between the incident/releasing portion for an optical signal of the light-receiving/emitting element 12 and the incident/releasing port 11c for an optical signal of the optical waveguide 11 of the optical transmission module 1, as well as the positional relationship between the two ports, can be maintained in a fixed state. Therefore, it is possible to provide a stable data transmission, without fluctuations in the optical coupling efficiency.

In the present embodiment, since upon connecting the optical transmission module 1 to the substrate 2, no heat such as soldering is utilized, the assembling operation can be easily carried out. Moreover, since the package 14 of the optical transmission module 1 are supported from the side faces (X-axis direction, Y-axis direction), the connecting portion of the optical transmission module 1 can be made smaller and thinner, in comparison with a conventional structure using an electric connector.

Figure 6A:
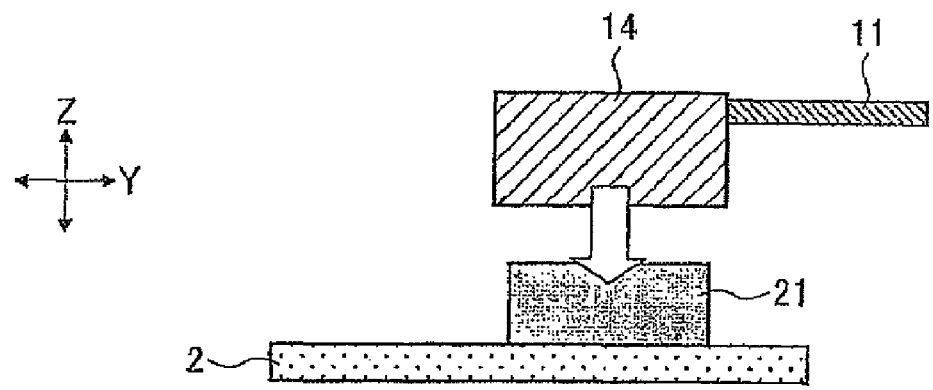
FIG. 6(a) is a side view that shows another connection method between the optical transmission module and the substrate.
Figure 6B:
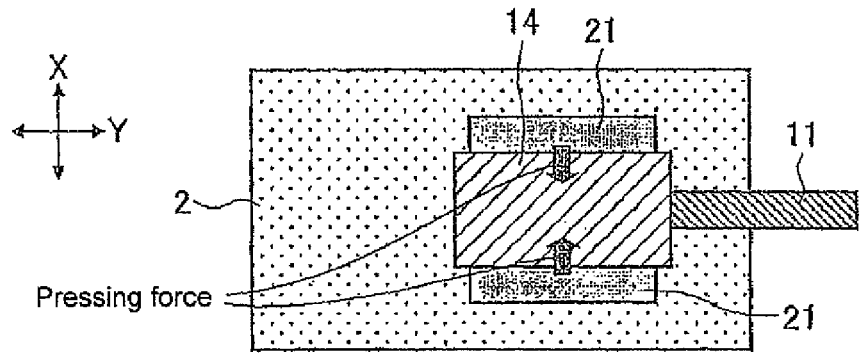
FIG. 6(b) is a plan view that shows another connection state between the optical transmission module and the substrate shown in FIG. 6(a).

Here, as shown in FIGS. 6(a) and 6(b), a pair of elastic holding units 21 may be placed so as to face each other in the X-axis direction. In this manner, the securing positions of the elastic holding units 21 on the substrate 2 may be determined at any positions as long as they allow the package 14 to be fitted thereto, and can be adjusted on demand by taking into consideration the layout relative to other elements to be assembled onto the substrate 2.

Figure 7A:
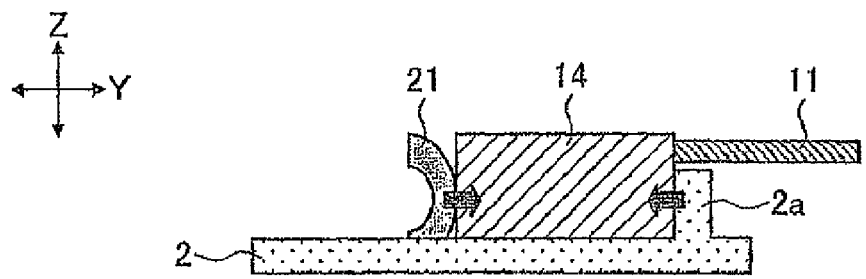
FIG. 7(a) is a plan view that shows a connection state between the optical transmission module and a substrate having a step portion formed therein.
Figure 7B:
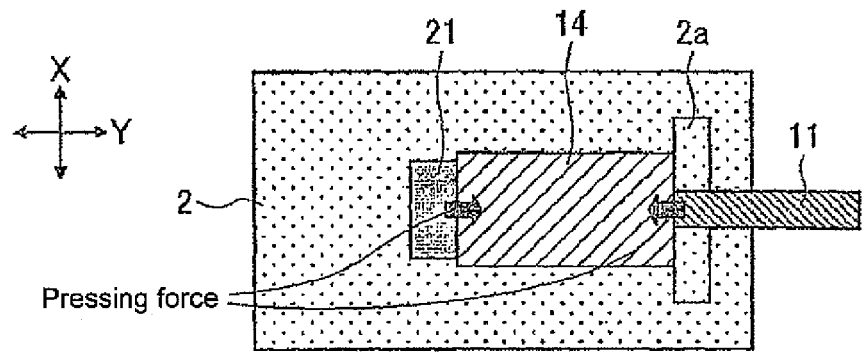
FIG. 7(b) is a plan view that shows a connection state between the optical transmission module and the substrate shown in FIG. 7(a).
Figure 8A:
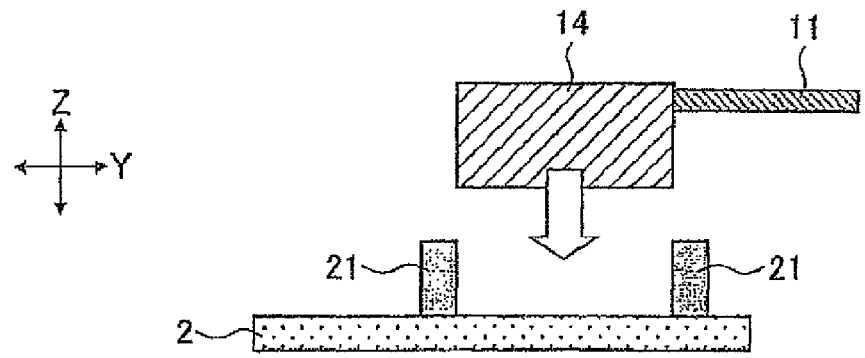
FIG. 8(a) is a side view that shows still another connection method between the optical transmission module and the substrate.
Figure 8B:
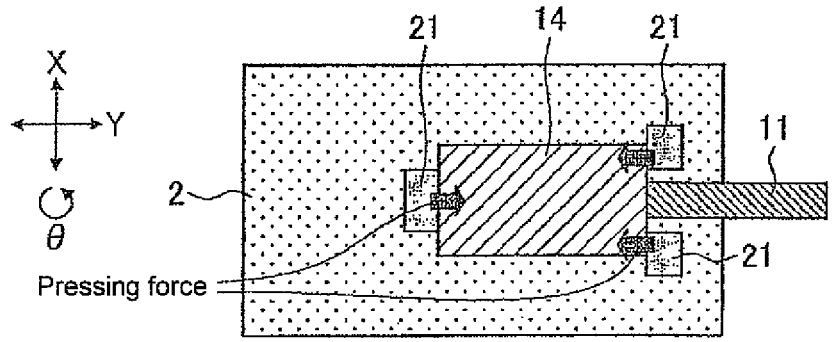
FIG. 8(b) is a plan view that shows still another connection state between the optical transmission module and the substrate shown in FIG. 8(a).
Figure 9A:
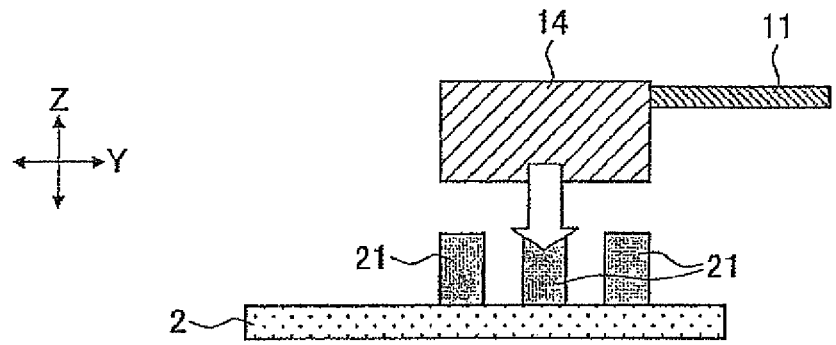
FIG. 9(a) is a side view that shows still another connection method between the optical transmission module and the substrate.
Figure 9B:
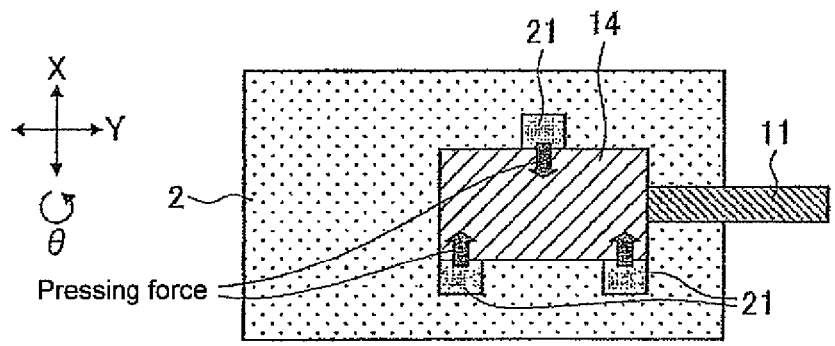
FIG. 9(b) is a plan view that shows still another connection state between the optical transmission module and the substrate shown in FIG. 9(a).
Figure 10A:
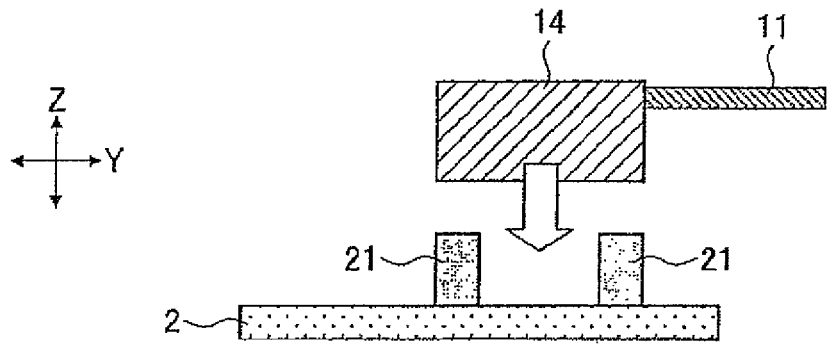
FIG. 10(a) is a side view that shows still another connection method between the optical transmission module and the substrate.
Figure 10B:
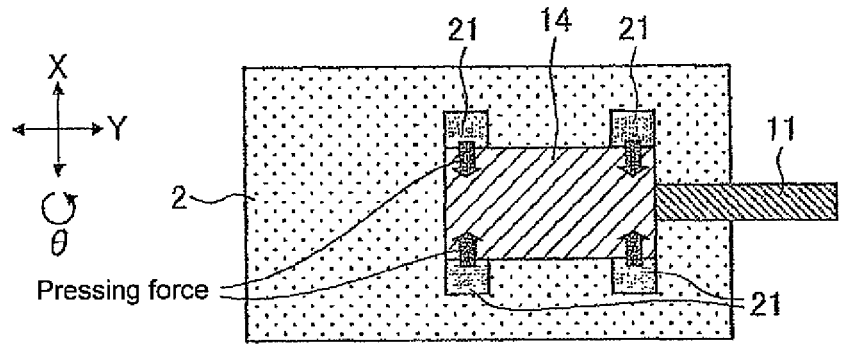
FIG. 10(b) is a plan view that shows still another connection state between the optical transmission module and the substrate shown in FIG. 10(a).
Figure 11A:
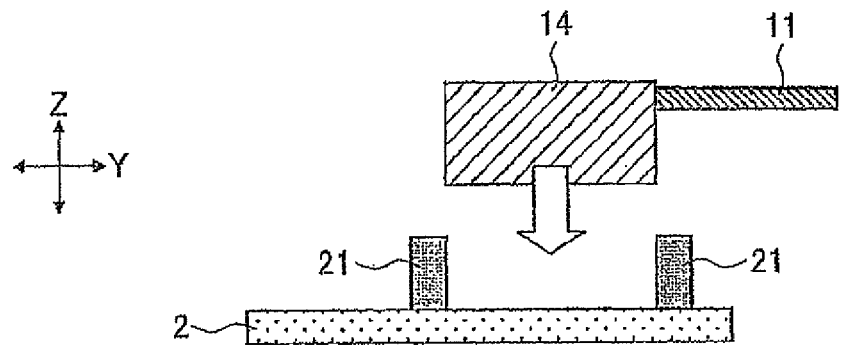
FIG. 11(a) is a side view that shows still another connection method between the optical transmission module and the substrate.
Figure 11B:
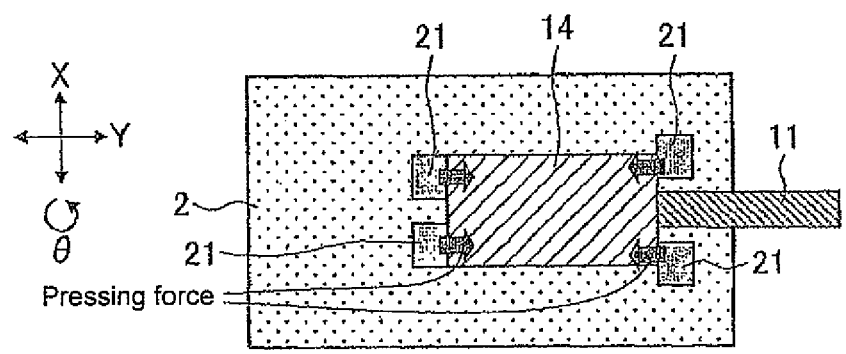
FIG. 11(b) is a plan view that shows still another connection state between the optical transmission module and the substrate shown in FIG. 11(a).

Here, the above explanation has exemplified a structure in which the paired elastic holding units 21 are placed, with the package 14 of the optical transmission module 1 being supported from the two sides; however, not limited by this structure, at least one elastic holding unit 21 may be installed. In this case, as shown in FIG. 7(a) and FIG. 7(b), a step portion 2a is formed at a position facing the elastic holding unit 21 on the substrate 2, and the package 14 may be fitted to the gap between the step portion 2a and the elastic holding unit 21. The step portion 2a may be integrally formed together with the substrate 2, or may be secured thereto as a separated member. Here, the elastic holding unit 21 is preferably formed into a curved shape toward the step portion 2a side so as to easily insert the package 14 between the two portions.

Moreover, as shown in FIGS. 8(a) and 8(b) to FIGS. 11(a) and 11(b), a plurality of the elastic holding units 21 may be placed on the substrate 2 so as to provide three or more contact points between the optical transmission module 1 and the elastic holding units 21. With this arrangement, even when the optical transmission module 1 is subjected to a stress exerted in the rotation direction θ around the Z-axis on the substrate 2, the stress is absorbed by the elastic holding units 21, and is not exerted onto the optical transmission module 1. Therefore, the optical transmission module 1 can be further stabilized.

Figure 12A:
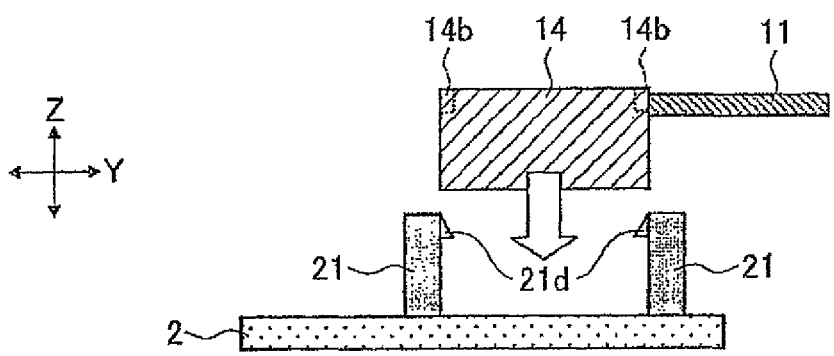
FIG. 12(a) is a side view that shows a connection method between the optical transmission module and the substrate in a case where a protruding portion is formed on an elastic holding unit.
Figure 12B:
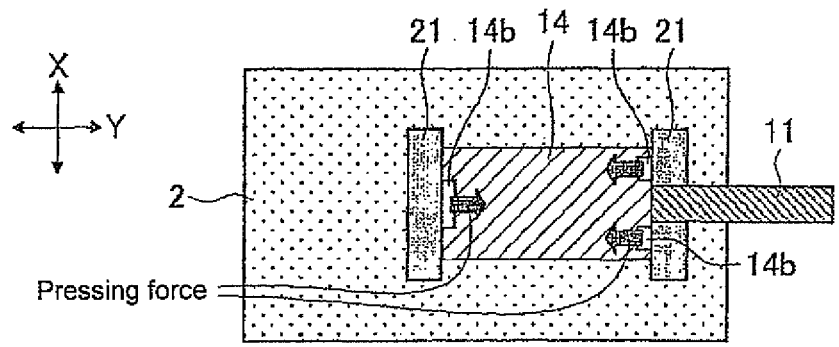
FIG. 12(b) is a plan view that shows a connection state between the optical transmission module and the substrate shown in FIG. 12(a).

Furthermore, as shown in FIGS. 12(a) and 12(b), another structure may be proposed in which an elastic protrusion 21d having a tilt face is attached to the upper portion of the elastic holding unit 21 in the Z-axis direction. With this structure, the package 14 of the optical transmission module 1 can be easily inserted to a gap between the elastic holding units 21, and the package 14 thus inserted and held can be hardly detached from the substrate 2 even when subjected to a stress in the Z-axis direction. Consequently, the optical transmission module 1 can be held more stably. Here, in order to hold the optical transmission module 1 more stably, a concave portion 14b that receives the protrusion 21d may be formed on the upper face of the package 14.

Here, although the present embodiment has a structure in which the elastic holding unit 21 is attached to the side face of the package 14 of the optical transmission module 1, for example, another structure may be used in which the elastic holding unit 21 is placed between the substrate 2 and the package 14. That is, the package 14 may be mounted on the upper face (Z-axis direction) of the elastic holding unit 21 mounted on the substrate 2. With this arrangement, even when a deformation occurs in the substrate 1 on which the optical transmission module 1 is assembled, the deformation of the optical transmission module 1 can be prevented.

Figure 13A:
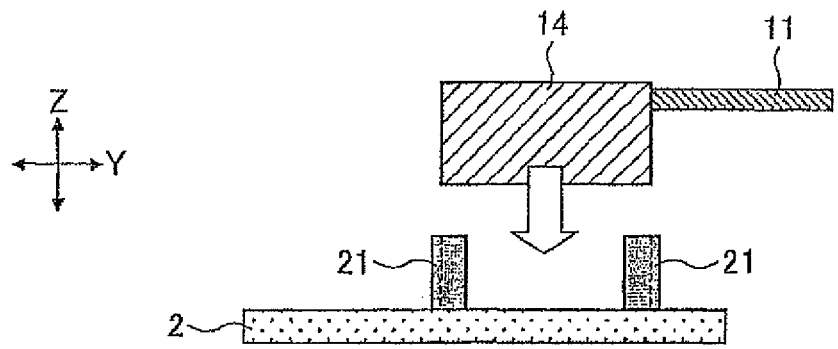
FIG. 13(a) is a side view that shows a connection method between the optical transmission module and the substrate in a case where a key-shaped elastic holding unit is installed.
Figure 13B:
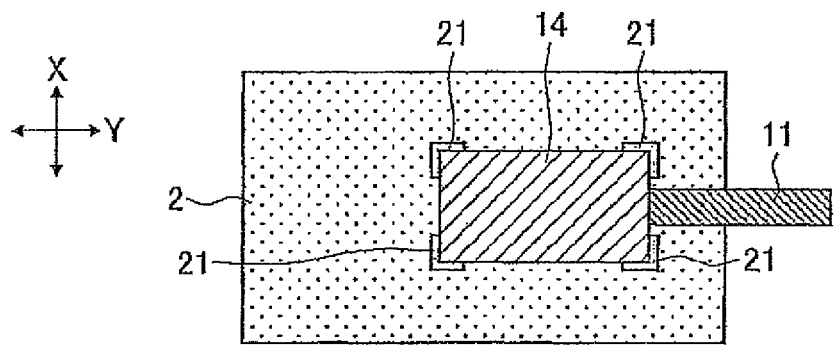
FIG. 13(b) is a plan view that shows a connection state between the optical transmission module and the substrate shown in FIG. 13(a).

As shown in FIGS. 13(a) and 13(b), another structure may be used in which elastic molding units 21, each having a key shape, are placed at four portions on the substrate 2 that correspond to the four corners of the package 14 of the optical transmission module 1. With this arrangement, stresses in various directions, occurring in the substrate 2, can be absorbed by the elastic holding units 21 on the four corners, and are not exerted onto the optical transmission module 1. For this reason, the optical transmission module 1 can be further stabilized. In this manner, since the four corners of the optical transmission module 1 are held in the above-mentioned structure, stable data transmission is available even when the respective elastic holding units 21 are miniaturized. Therefore, the optical transmission module 1 can be mounted on an apparatus having a smaller size.

Figure 14A:
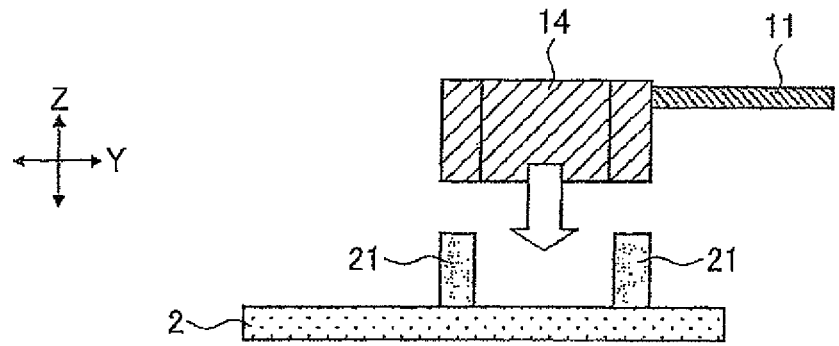
FIG. 14(a) is a side view that shows a connection method between the optical transmission module and the substrate in a case where a rectangular-pillar-shaped elastic holding unit is installed.
Figure 14B:
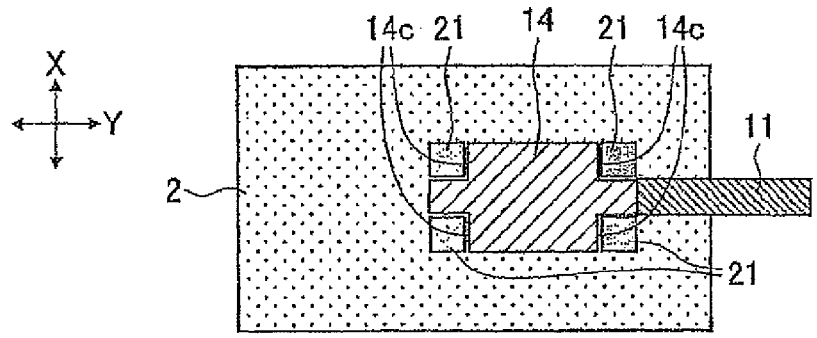
FIG. 14(b) is a plan view that shows a connection state between the optical transmission module and the substrate shown in FIG. 14(a).

Moreover, as shown in FIGS. 14(a) and 14(b), rectangular pillar-shaped elastic holding units 21 may be placed at four portions of the substrate 2, and cut-out portions (concave portions) 14c in the Z-axis direction, which receive the elastic holding units 21, may be formed at four corners of the package 14 of the optical transmission module 1. With this arrangement, the same effects as those shown in FIGS. 13(a) and 13(b) can be obtained. Moreover, the outside dimension of the package 14 which houses the elastic holding units 21 is made virtually the same as the outside dimension of the package 14 shown in FIGS. 13(a) and 13(b), it becomes possible to further miniaturize the entire module.

Figure 15A:
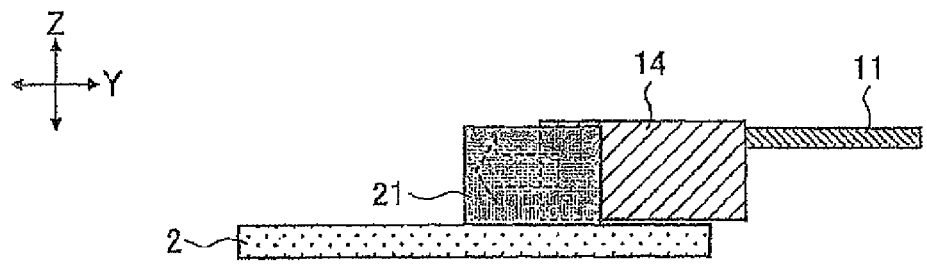
FIG. 15(a) is a side view that shows still another connection method between the optical transmission module and the substrate.
Figure 15B:
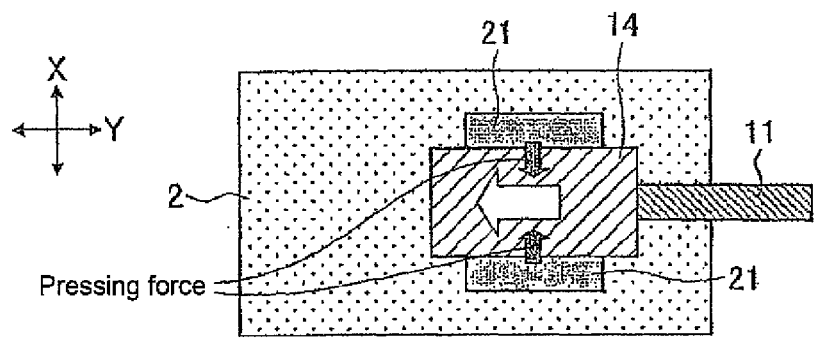
FIG. 15(b) is a plan view that shows a connection state between the optical transmission module and the substrate shown in FIG. 15(a).
Figure 16A:
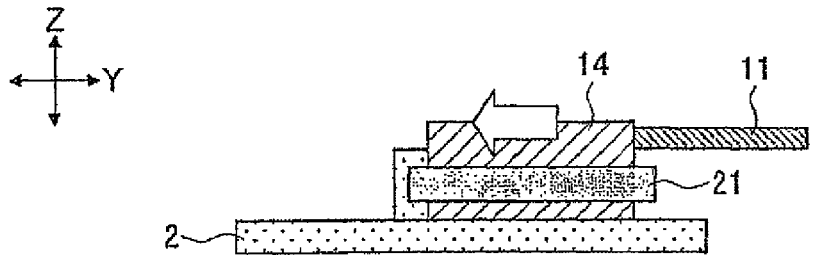
FIG. 16(a) is a side view that shows still another connection method between the optical transmission module and the substrate.
Figure 16B:
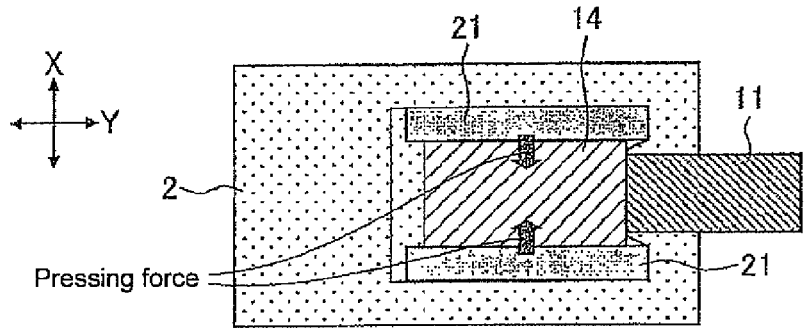
FIG. 16(b) is a plan view that shows a connection state between the optical transmission module and the substrate shown in FIG. 16(a).

Here, in the above-mentioned structures, the explanation has been given by exemplifying a structure in which the package 14 of the optical transmission module 1 is inserted into the gap between the elastic holding units 21 from above in the Z-axis direction; however, not limited by this structure, it may be inserted in the Y-axis direction or in the X-axis direction. This structure is more effective in a case where the optical transmission module 1 is connected between laminated substrates or when no space is available above the substrate 2 in the Z-axis direction. FIGS. 15(a) and 15(b) as well as FIGS. 16(a) and 16(b) show one example of the above-mentioned structure, which is also applicable to a structure provided with a plurality of elastic holding units 21.

Figure 17A:
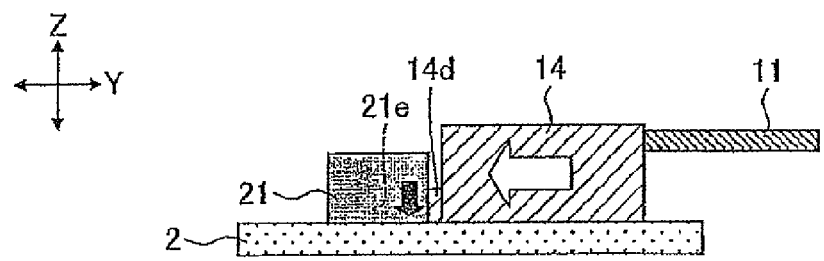
FIG. 17(a) is a side view that shows a connection method between the optical transmission module and the substrate in a case where a convex portion is formed on an outer wall of a package of the optical transmission module.
Figure 17B:
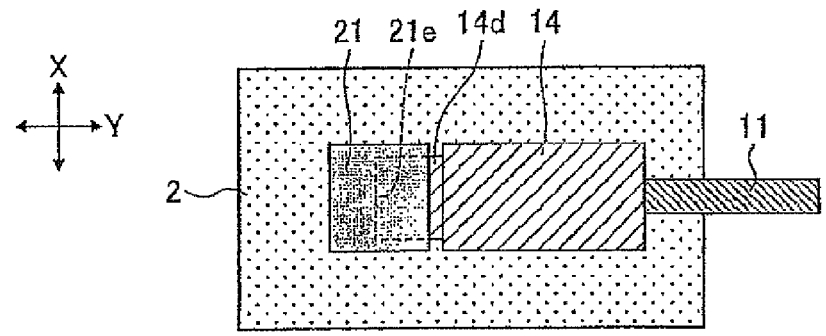
FIG. 17(b) is a plan view that shows a connection state between the optical transmission module and the substrate shown in FIG. 17(a).
Figure 18A:
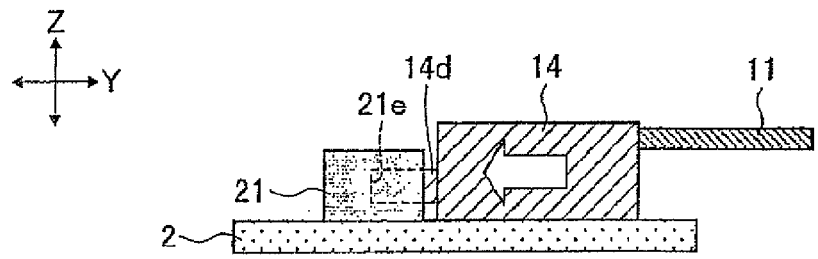
FIG. 18(a) is a side view that shows a connection method between the optical transmission module and the substrate in a case where a convex portion is formed virtually in the center of an outer wall of a package of the optical transmission module.
Figure 18B:
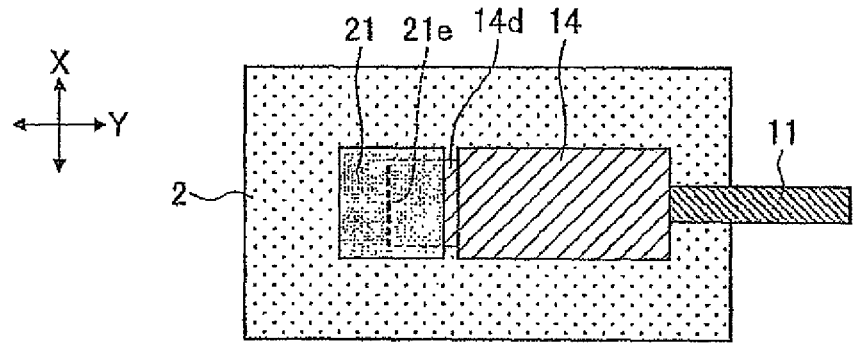
FIG. 18(b) is a plan view that shows a connection state between the optical transmission module and the substrate shown in FIG. 18(a).

Moreover, as shown in FIGS. 17(a) and 17(b), another structure may be used in which a convex portion 14d is formed on the outer wall of the package 14 of the optical transmission module 1, while a concave portion 21e that receives the convex portion 14d is formed on the outer wall of the elastic holding unit 21. In accordance with this structure, by inserting the convex portion 14d of the package 14 into the concave portion 21e of the elastic holding unit 21, the optical transmission module 1 can be held so that the optical transmission module 1 can be easily inserted between the elastic holding units 21 of the optical transmission module 1, thereby making it possible to improve the efficiency of the assembling operation. Here, in order to electrically connect the optical transmission module 1 and the substrate 2 to each other, the electrode 21c is preferably installed in the concave portion 21e. Moreover, the attaching position of the convex portion 14d to the package 14 and the attaching position of the concave portion 21e to the elastic holding unit 21 are not particularly limited, and, for example, as shown in FIGS. 18(a) and 18(b), these may be attached to virtually the middle position in the Z-axis direction.

Figure 19:
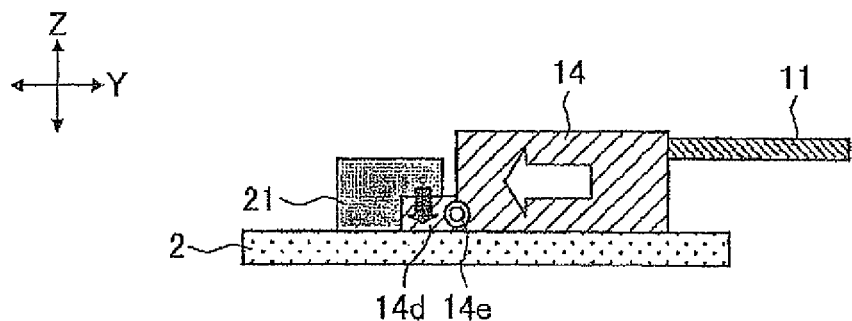
FIG. 19 is a side view that shows a connection method between the optical transmission module and the substrate in a case where an elastic member is placed between the outer wall of a package of the optical transmission module and the convex portion, shown in FIG. 17(a).

Moreover, as shown in FIG. 19, an elastic portion 14e, such as a spring, may be formed between the outer wall of the package 14 and the convex portion 14d, shown in FIGS. 17(a) and 17(b).

Figure 20A:
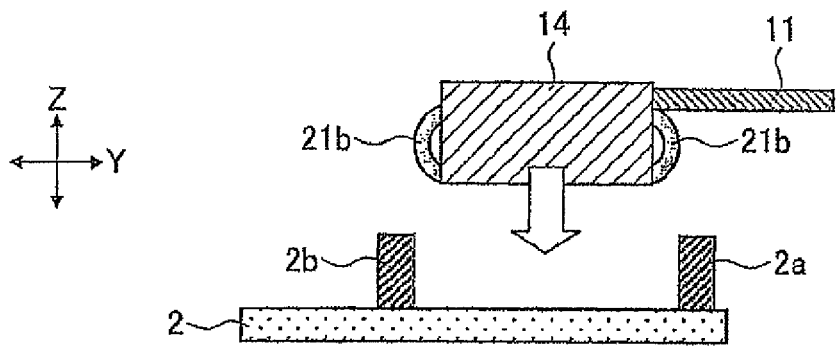
FIG. 20(a) is a side view that shows a connection method between the optical transmission module and the substrate in a case where a holding unit is formed on an outer wall of a package of the optical transmission module.
Figure 20B:
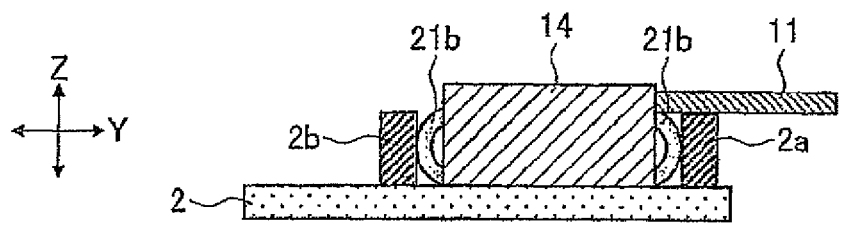
FIG. 20(b) is a side view that shows a connection state between the optical transmission module and the substrate shown in FIG. 20(a).

Here, the present embodiment has exemplified a structure in which, after the elastic holding unit 21 has been preliminarily secured onto the substrate 2 by soldering or the like, the optical transmission module 1 is assembled thereon; however, not limited to this structure, for example, another structure may be used in which the package 14 of the optical transmission module 1 is provided with the elastic holding unit 21, and the elastic holding unit 21 is assembled onto the substrate 2. Moreover, as shown in FIGS. 20(a) and 20(b), holding units 21b are formed on the two side faces (outer walls) of the package 14, and the package 14 may be inserted into a pair of step portions 2a and 2b formed on the substrate 2 so as to face each other. In the above-mentioned structure, in order to easily insert the package 14 into the step portions 2a and 2d, the holding unit 21b is preferably formed into a curved shape outward from the package 14. With this structure, the package 14 can be held on the substrate 2, and, for example, even when the substrate 2 is subjected to a stress exerted in the rotation direction θ around the Z-axis, the stress is absorbed by the elastic holding unit 21, and is not exerted onto the package 14 of the optical transmission module 1. Therefore, it is possible to carry out data transmission in a stable manner, without fluctuations in the optical coupling efficiency. Moreover, since this structure holds the side faces (X-axis direction, Y-axis direction) of the package 14, the height in the Z-axis direction can be suppressed, thereby making it possible to provide a thinner device.

Figure 21A:
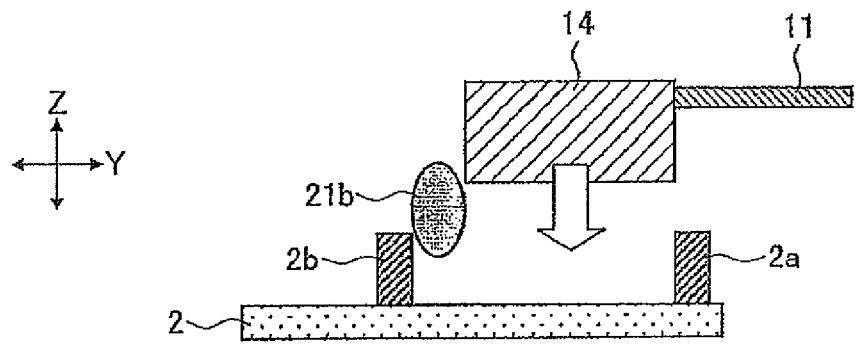
FIG. 21(a) is a side view that shows a connection method between the optical transmission module and the substrate in a case where a holding unit is inserted between the optical transmission module and a step portion formed on the substrate.
Figure 21B:
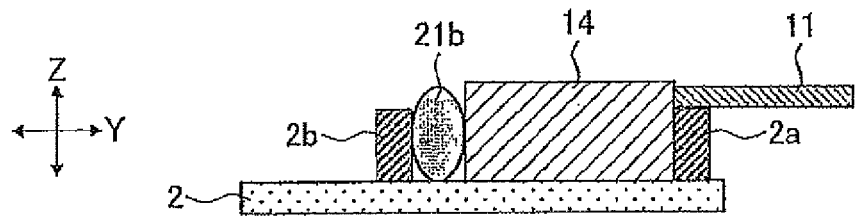
FIG. 21(b) is a side view that shows a connection state between the optical transmission module and the substrate shown in FIG. 21(a).

Moreover, as shown in FIGS. 21(a) and 21(b), another structure may be used in which, on the inside of paired step portions 2a and 2b formed on the substrate 2 so as to face each other, a holding unit 21b is inserted between the package 14 and the step portion 2a and/or the step portion 2b so as to hold the side faces of the package 14 of the optical transmission module 1. With this structure, since the deformation of the substrate 2 is absorbed by the holding unit 21, the deformation of the package 14 can be prevented.

Figure 22A:
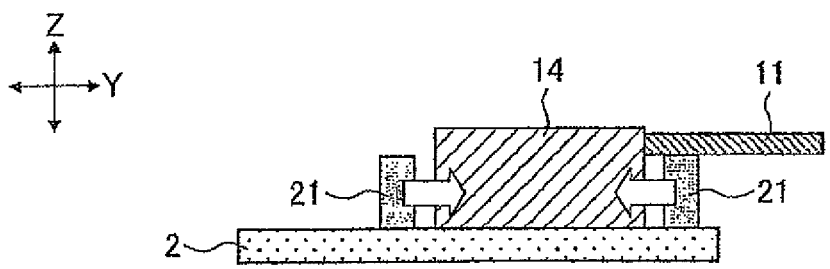
FIG. 22(a) is a side view that shows a connection method between the optical transmission module and the substrate, in a case where, after positioning the optical transmission module on the substrate, an elastic holding unit is assembled thereon.
Figure 22B:
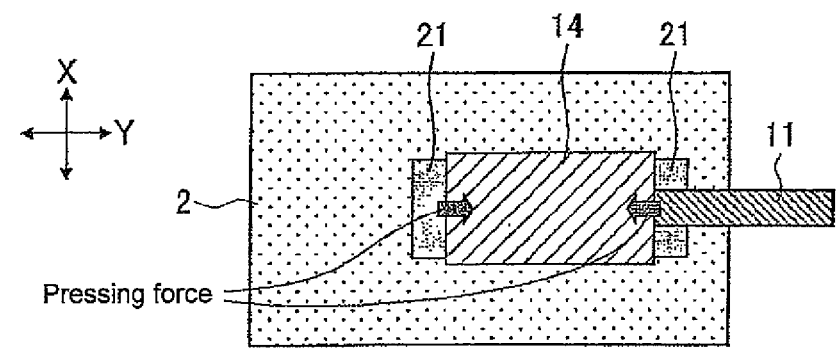
FIG. 22(b) is a plan view that shows a connection state between the optical transmission module and the substrate shown in FIG. 22(a).
Figure 23A:
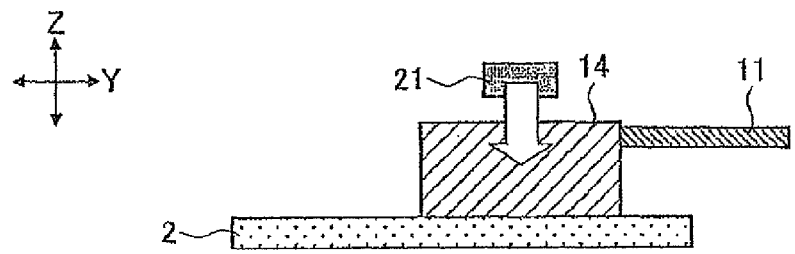
FIG. 23(a) is a side view that shows a connection method between the optical transmission module and the substrate in a case where a flat-plate-shaped elastic member is assembled on the optical transmission module.
Figure 23B:
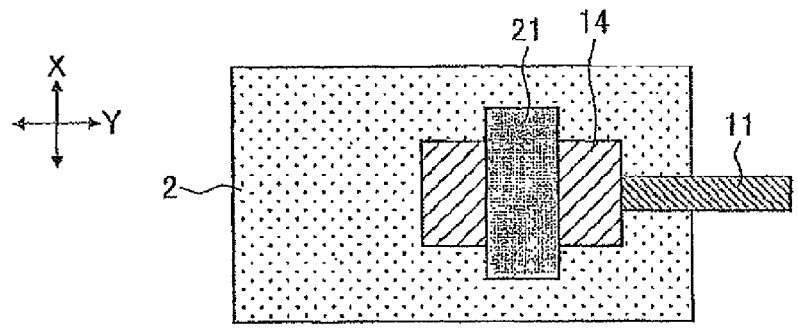
FIG. 23(b) is a plan view that shows a connection state between the optical transmission module and the substrate shown in FIG. 23(a).

Furthermore, as shown in FIGS. 22(a) and 22(b), another structure may be used in which, after the optical transmission module 1 has been position at a desired position of the substrate 2, the elastic holding unit 21 is assembled on the substrate 2. With this structure, since the mounting position of the optical transmission module 1 can be freely determined, the assembling efficiency on the substrate 2 can be improved. Here, as shown in FIGS. 23(a) and 23(b), a structure may be adopted in which a flat-plate-shaped elastic holding unit 21 is assembled in a manner so as to cover the package 14 of the optical transmission module 1 from above (Z-axis direction). With this structure, the mounting position of the optical transmission module 1 can be freely determined, and even when a deformation occurs in the substrate 2 in the Z-axis direction, data transmission can be carried out more stably.

Figure 24:
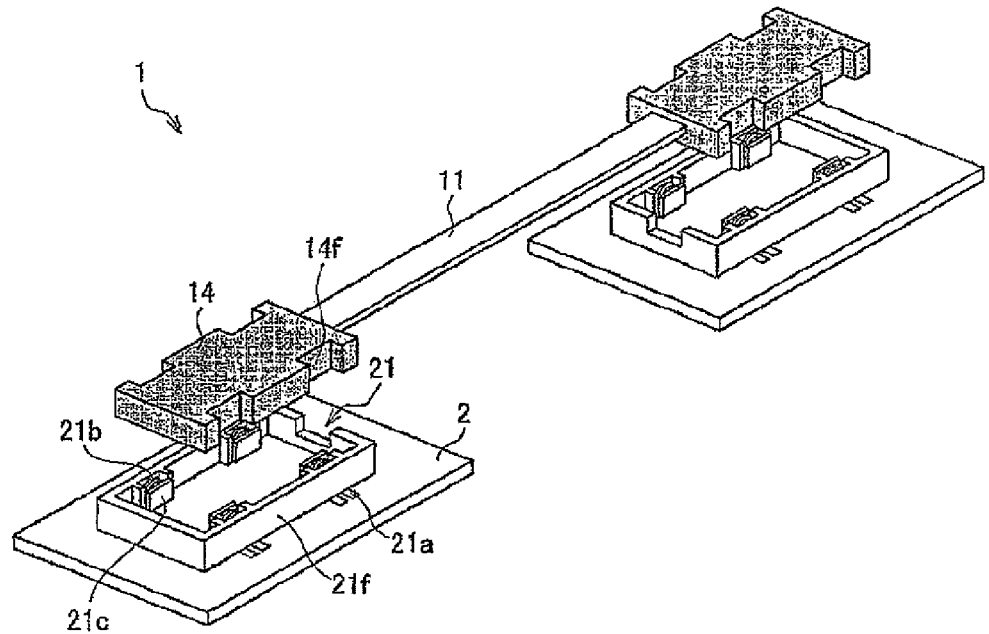
FIG. 24 is a perspective view that shows a connection method between the optical transmission module and the substrate in a case where the optical transmission module is assembled on a box-shaped elastic holding unit.

Referring to FIG. 24, the following description will discuss another structure of the elastic holding unit 21. FIG. 24 is a perspective view that shows a method for connecting the optical transmission module 1 and the substrate 2 to each other, upon assembling the optical transmission module 1 on the elastic holding unit 21.

As shown in FIG. 24, the elastic holding unit 21 is provided with a box member 21f formed into a box shape with an upper face in the Z-axis direction being open, pins 21a that are electrically connected and secured onto the substrate 2 formed on the outer wall face of the box member 21f, and elastic portions 21b, each made of a spring or the like, which are attached to the inside of the box member 21f so as to hold the package 14 of the optical transmission module 1 at four positions. Moreover, at positions on the elastic portions 21b to be made in contact with the package 14, electrodes 21c are formed. Here, the box member 21f is preferably molded and formed by resin as an integral unit.

Moreover, as shown in FIG. 24, on the outer wall faces of the package 14 of the optical transmission module 1, groove portions (concave portions) 14f that receive the electrodes 21a are preferably formed in the Z-axis direction.

In accordance with this structure, since the optical transmission module 1 can be assembled by fitting the package 14 thereof to the elastic holding unit 21 having the box shape, the efficiency of the attaching operation can be improved. Moreover, since the optical transmission module 1 can be held by a plurality of fulcrums, the optical transmission module 1 can be further stabilized so that data transmission can be carried out in a stable manner. Furthermore, since the elastic holding unit 21 can be formed by using an integral resin molding operation, it becomes possible to achieve superior general purpose operations, and consequently to cut costs.

Figure 25A:
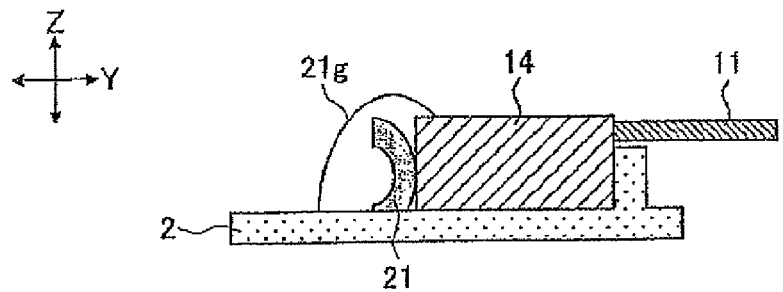
FIG. 25(a) is a side view that shows a state in which the optical transmission module and the substrate are electrically connected to each other by a wire.
Figure 25B:
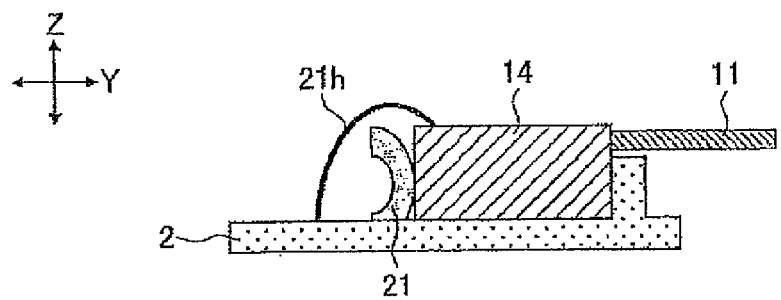
FIG. 25(b) is a side view that shows a state in which the optical transmission module and the substrate, as shown in FIG. 25(a), are electrically connected to each other by FPC.
Figure 26:
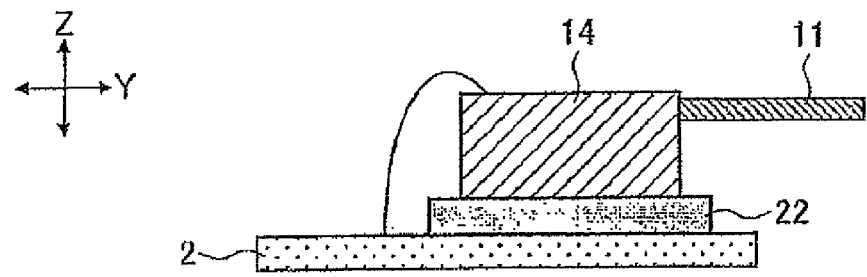
FIG. 26 is a side view that shows a connection state between the optical transmission module and the substrate in a case where an adhesive sheet is used as an elastic holding unit.

Here, the present embodiment has exemplified a structure in which the electrodes 21c are formed on the elastic holding unit 21; however, not limited to this structure, for example, as shown in FIGS. 25(a) and 25(b), another structure may be used in which one end of a wire 21g or a flexible printed circuit board (FPC) 21h is connected to the substrate 2, with the other end being connected to the package 14 of the optical transmission module 1. With this structure, the substrate 2 and the optical transmission module 1 can be electrically connected to each other, without the elastic holding unit 21 being interposed therebetween. In this case, as shown in FIG. 26, by using an adhesive sheet 22 including no electrodes as the elastic holding unit 21, the package 14 of the optical transmission module 1 and the substrate 2 may be connected to each other.

Furthermore, as a modified example of the elastic holding unit 21 shown in FIGS. 25(a) and 25(b), the elastic holding unit 21 may be configured by an elastic portion 21b formed on the substrate 2 and a wire 21g or a flexible printed circuit board (FPC) 21h that is electrically connected to the optical transmission module 1.

Figure 27A:
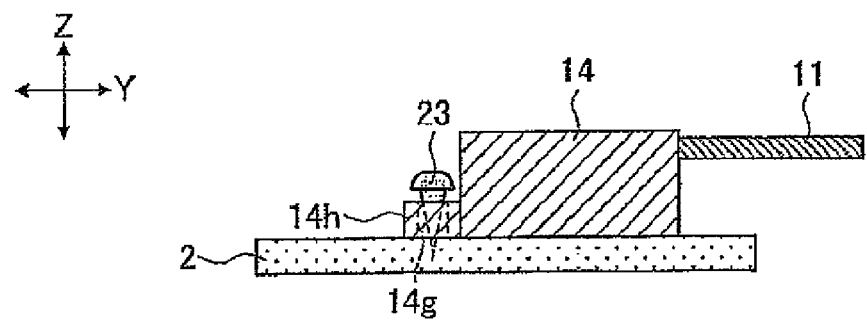
FIG. 27(a) is a side view that shows a connection state between the optical transmission module and the substrate by the use of a securing pin.
Figure 27B:
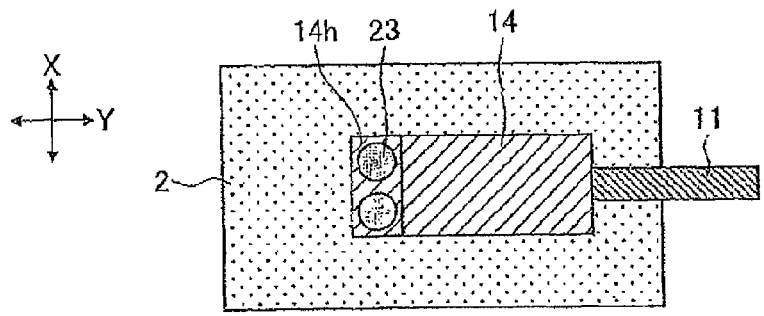
FIG. 27(b) is a plan view that shows a connection state between the optical transmission module and the substrate as shown in FIG. 27(a).

As shown in FIGS. 27(a) and 27(b), another structure may be used in which a protrusion 14h having a through hole 14g is formed on the outer wall of the package 14 of the optical transmission module 1, and by using a securing pin 23 having a diameter smaller than the inner diameter of the through hole 14g, the package 14 may be connected to the substrate 2. With this structure, since a clearance is formed between the securing pin 23 and the through hole 14g, the package 14 is allowed to move relative to the substrate 2. For this reason, the optical transmission module 1 is made free from influences of a deformation occurring in the substrate 2.

Figure 28:
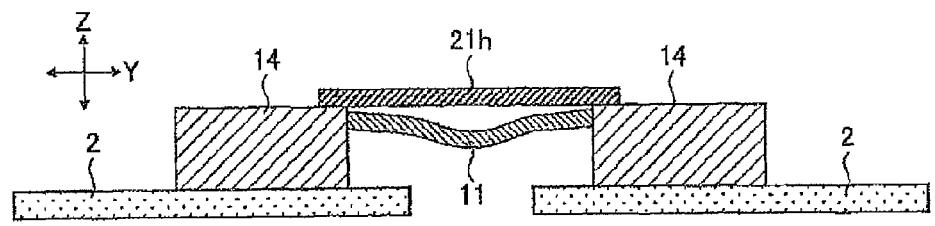
FIG. 28 is a side view that shows a state in which substrates are connected to one another by using FPC and an optical waveguide.

Here, the optical transmission module 1 of the present embodiment may be installed together with electric wiring that allows communication between the substrates 2, such as, for example, an FPC 21h. In this case, as shown in FIG. 28, the length of the optical waveguide 11 of the optical transmission module 1 is preferably made longer than the length of the FPC 21h. With this arrangement, even when a force is applied in the Y-axis direction, no load is applied to the optical waveguide 11 so that it is possible to prevent damages to the optical waveguide 11, and consequently to carry out data communication in a stable manner.

FIG. 29(a) is a view that shows a detailed structure of the optical transmission module shown in FIG. 28, and FIG. 29(b), which is an A-A' line cross-sectional view of FIG. 29(a), is a view that shows a method for connecting the optical transmission module 1 and the substrate 2, in a case where the package 14 is inserted between the elastic holding units 21. As shown in FIGS. 29(a) and 29(b), the optical transmission module 1 is configured by an optical waveguide 11, a light-receiving/emitting element 12, a package 14, an elastic holding unit 21 and a third substrate 24.

The package 14 is formed into a concave shape that is provided with a substrate on which the light-receiving/emitting element 12 is mounted and side walls that rise from the substrate so as to house the optical waveguide 11 and the light-receiving/emitting element 12 therein. The light-receiving/emitting element 12 has a structure in which electric terminals 24 of the light-receiving/emitting element 12 are secured onto the substrate by soldering. Moreover, the substrate and the side walls are designed to be connected to each other by a solder 25a. Here, an electric wire 26a that allows electrical connection with the outside is installed in the side walls.

The package 14 and the third substrate 24 are connected to each other through the electric wire 26a placed in the side faces of the package 14 by a solder 25b. In this manner, since the package 14 and the third substrate 24 are connected only through the flexible electric wiring 26a, stresses, exerted by those actions, such as vibration, impact, thermal expansion, deflection, tension, and fitting action, to be applied to the third substrate 24, are hardly transferred to the package 14. For this reason, since the light-receiving/emitting element 12 and the optical waveguide 11 become less susceptible to influences due to deformation of the third substrate 24, it is possible to transmit data in a stable manner, without causing fluctuations in the optical coupling efficiency.

The elastic holding units 21 are formed on the substrate 2 so as to face each other, and provided with an electric wire 26b having a spring structure that gives a pressing force (indicated by a black arrow in FIG. 29(b)) in mutually facing directions. With this structure, as shown in FIG. 29(b), the package 14 is inserted between the opposing elastic holding units 21 (in a direction indicated by a white arrow in the same Figure) so as to be secured to the substrate 2. With this arrangement, it becomes possible to maintain the package 14 with being electrically connected.

Here, the package 14 is preferably formed by a resin molding operation, and allowed to have rigidity greater than that of the third substrate 24. Moreover, the third substrate 24 is preferably provided as a substrate having flexibility, such as an FPC.

FIG. 30 is a view that shows a state in which, in the optical transmission module shown in FIG. 29(b), resin 27 is injected between the third substrate 24 and the package 14.

The resin 27 to be injected preferably has an elastic modulus that is smaller than the elastic modulus of the package 14. With this structure, since stresses, exerted by those actions, such as vibration, impact, thermal expansion, warping, tension, and fitting action, to be applied to the third substrate 24, are absorbed by the resin 27, those stresses are hardly transmitted to the package 14. For this reason, since the light-receiving/emitting element 12 and the optical waveguide 11 become less susceptible to influences due to deformation of the third substrate 24, it is possible to transmit data in a stable manner, without causing fluctuations in the optical coupling efficiency.

Moreover, the resin 27 is preferably made to have a hardness that is higher than the hardness of the package 14. Since this structure makes the stress occurring in the third substrate 24 interrupted by the resin 27, the stress is hardly transferred to the package 14. Thus, it becomes possible to obtain the same effects as those described above.

Application Examples

Lastly, for example, the optical transmission module 1 of the present embodiment may be applied to the following electronic apparatuses.

First, the first application example includes hinge portions of an electronic apparatus of a folding type, such as a folding-type portable telephone, a folding-type PHS (Personal Handyphone System), a folding-type PDA (Personal Digital Assistant) and a folding-type notebook personal computer.

FIGS. 31(a) to 31(c) show examples in which the optical transmission module 1 is applied to a folding-type portable telephone 40. That is, FIG. 31(a) is a perspective view that shows the outer appearance of the folding-type portable telephone 40 having a built-in optical transmission module 1.

FIG. 31(b) is a block diagram that shows a portion in which the optical transmission module 1 is applied in the folding-type portable telephone 40 as shown in FIG. 31(a). As shown in this Figure, a control unit 41 formed on the main body 40a side of the folding-type portable telephone 40, an external memory 42 formed on the side of a lid (driving unit) 40b that is installed on one end of the main body so as to be rotatable with its hinge portion serving as an axis, a camera unit (digital camera) 43 and a display unit (liquid crystal display) 44 are respectively connected to one another by the optical transmission module 1.

FIG. 31(c) is a perspective plan view that shows the hinge portion (portion surrounded by a broken line) in FIG. 31(a). As shown in this Figure, the optical transmission module 1 is wound around a supporting rod in the hinge portion, and allowed to bend so that the control unit formed on the main body side, the external memory 42, the camera unit 43 and the display unit 44, placed on the lid side, are respectively connected to one another.

By applying the optical transmission module 1 to such a folding-type electronic apparatus, it becomes possible to achieve high-speed communication with a large capacity within a limited space. Therefore, it is suitably applied to an apparatus that requires high-speed data communication with a large capacity, and also has to achieve a small size, for example, such as a folding-type liquid crystal display.

The second application example of the optical transmission module 1 includes apparatuses having a driving unit, such as a printer head in a printing apparatus (electronic apparatus) and a reading unit in a hard disk recording/reproducing apparatus.

FIGS. 32(a) to 32(c) show examples in which the optical transmission module 1 is applied to a printing apparatus 50. FIG. 32(a) is a perspective view that shows the outer appearance of the printing apparatus 50. As shown in this Figure, the printing apparatus 50 is provided with a printer head 51 that carries out a printing process on paper 52, while being moved in a width direction of the paper 52, and one end of the optical transmission module 1 is connected to this printer head 51.

FIG. 32(b) is a block diagram that shows a portion in which the optical transmission module 1 is applied to the printing apparatus 50. As shown in this Figure, one end of the optical transmission module 1 is connected to the printer head 51, and the other end is connected to the substrate on the main body side in the printing apparatus 50. Here, a control means and the like, used for controlling the operations of the respective units of the printing apparatus 50, are installed in the substrate on the main body side.

FIGS. 32(c) and 32(d) are perspective views that show a curved state of the optical waveguide 11 of the optical transmission module 1, in a case where the printer head 51 is shifted (driven) in the printing apparatus 50. As shown in this Figure, when the optical transmission module 1 is applied to a driving unit such as the printer head 51, the curved state of the optical waveguide 11 is changed by the driving operations of the printer head 51, with the respective positions of the optical waveguide 11 being curved repeatedly.

Therefore, the optical transmission module 1 in accordance with the present embodiment is desirably applied to these driving units. Moreover, by applying the optical transmission module 1 to these driving units, it becomes possible to achieve high-speed communication with a large capacity by using the driving units.

FIG. 33 shows an example in which the optical transmission module 1 is applied to a hard disk recording/reproducing apparatus 60.

As shown in this Figure, the hard disk recording/reproducing apparatus 60 is provided with a disk (hard disk) 61, a head (reading/writing head) 62, a substrate introducing unit 63, a driving unit (driving motor) 64 and the optical transmission module 1.

The driving unit 64 drives the head 62 in a radial direction of the disk 61. The head 62 reads information recorded on the disk 61, and also writes information on the disk 61. Here, the head 62, which is connected to the substrate introducing unit 63 through the optical transmission module 1, allows the information read from the disk 61 to be propagated to substrate introducing unit 63 as an optical signal, and receives an optical signal of information, transferred from the substrate introducing unit 63, to be written onto the disk 61.

In this manner, by applying the optical transmission module 1 to a driving unit such as the head 62 of the hard disk recording/reproducing apparatus 60, it becomes possible to achieve high-speed communication with a large capacity.

The present invention is not intended to be limited by the above-mentioned embodiments, and various modifications may be made therein within the scope of the claims. That is, embodiments, obtained by combining technical means modified on demand within the scope of the claims, are also included within the technical scope of the present invention.

As described above, in the connection member of the present invention that relates to the connection member described above, the holding unit is preferably installed on the second substrate.

In accordance with the above-mentioned structure, since the holding unit is installed on the second substrate, the first substrate, held on the second substrate, is allowed to move relative to the second substrate. For this reason, even in a case where a deformation, such as a warp or the like, occurs in the second substrate due to influences of, for example, an external force and heat, since the amount of the deformation can be absorbed by the holding unit, no deformation occurs in the first substrate.

Moreover, in the connection member of the present invention that relates to the connection member described above, the holding unit is preferably allowed to hold a face of the first substrate in a direction that intersects with a face opposing to the second substrate face to which the connection unit is connected.

In accordance with the above-mentioned arrangement, the first substrate has its face, extending in a direction orthogonal to the face opposing to the second substrate face to which the connection unit is connected of the first substrate, held by the holding unit. That is, since the connection member is not connected between the second substrate and the first substrate, or to a face of the first substrate on the side opposite to the face opposing to the second substrate, but connected to a side face of the first substrate, with the result that the height in a direction orthogonal to the second substrate face can be suppressed, thereby making it possible to make the entire module including the second substrate and the first substrate smaller and thinner.

Moreover, the connection member of the present invention, which relates to the above-mentioned connection member, is provided with at least one pair of the holding units, and the paired holding units are preferably allowed to hold the first substrate by applying pressing forces in opposite directions to the first substrate.

In accordance with the above-mentioned arrangement, the first substrate is held by receiving pressing forces in opposing directions from at least the pair of holding units.

With this arrangement, the first substrate is held by elastic holding units, with the side faces of the first substrate being sandwiched thereby; therefore, even in the case where a deformation such as a warp occurs in the second substrate due to influences of, for example, an external force and heat, the amount of deformation can be absorbed by the holding units so that no deformation occurs in the first substrate. Therefore, the positional relationship between the optical element to be mounted on the first substrate and the optical waveguide can be maintained constant so that data transmission can be carried out in a stable manner without fluctuations in the optical coupling efficiency. Moreover, since the side faces of the first substrate are held, the entire module including the second substrate and the first substrate can be made smaller and thinner.

Moreover, in the connection member of the present invention that relates to the connection member described above, the connection unit is preferably formed into a concave shape so as to receive the first substrate, while the holding unit is preferably formed on a face inside the concave portion, which opposes to the inner space.

In accordance with the above-mentioned arrangement, since the first substrate is held by the elastic holding units inside the concave portion of the connection unit, with the side faces of the first substrate being sandwiched thereby, the first substrate can be held more stably, and data transmission can be carried out more stably. Moreover, since the side faces of the first substrate can be held, the entire module including the second substrate and the first substrate can be made smaller and thinner.

Moreover, in the connection member of the present invention that relates to the connection member described above, the holding unit is preferably provided with an electrode at the connection position to the first substrate.

In accordance with the above-mentioned arrangement, since the holding unit is provided with the electrode at the connection position to the first substrate, the first substrate is maintained in the connected state to the electrode, even when the first substrate is moved relative to the second substrate. Therefore, it is possible to carry out data transmission in a stable manner.

Moreover, since the holding unit is provided with the electrode, it is not necessary to install a member used for electrically connecting the first substrate and the second substrate to each other in a separate manner so that the space on the second substrate can be effectively utilized, and the entire module including the second substrate and the first substrate can be made smaller.

In the connection member of the present invention that relates to the above-mentioned connection member, the connection unit is preferably provided with an electrode pin that is electrically connected to the second substrate.

In accordance with the above-mentioned arrangement, since the connection unit is provided with the electrode pin that is electrically connected to the second substrate, it can be connected to the second substrate by utilizing soldering. Moreover, the second substrate and the first substrate can be electrically connected to each other through the electrode pin.

In the optical transmission module of the present invention that relates to the above-mentioned optical transmission module, the holding unit is preferably formed on the first substrate.

With this arrangement, since, upon connecting the first substrate and the second substrate to each other, an elastic holding unit is interposed between the first substrate and the second substrate so that the first substrate is allowed to move relative to the second substrate. With this arrangement, even in the case where a deformation such as a warp occurs in the second substrate due to influences of, for example, an external force and heat, since the amount of deformation can be absorbed by the holding unit, no deformation occurs in the first substrate.

Moreover, in the optical transmission module of the present invention that relates to the above-mentioned optical transmission module, the first substrate is preferably provided with a concave portion that receives the connection member.

In accordance with the above-mentioned arrangement, since the first substrate is provided with the concave portion that receives the connection member, the outside dimension of the first substrate that has received the connection member can be made smaller in comparison with the first substrate having no concave portion. Therefore, the entire module including the second substrate and the optical transmission module can be miniaturized.

Moreover, in the optical transmission module of the present invention that relates to the above-mentioned optical transmission module, the first substrate is formed into a concave shape constituted by a bottom plate on which the optical element is mounted and side walls that rise from the bottom plate in a manner so as to surround the periphery of the optical element, and the concave portion that receives the connection member is preferably formed on a face on the side walls on the side opposite to the face that faces the inner space of the concave shape.

In accordance with the above-mentioned structure, the concave portion that receives the connection member is formed on a face on the side walls that rise from the bottom plate holding the optical element in a manner so as to surround the periphery of the optical element, on the side opposite to the face that faces the inner space of the concave shape.

With this arrangement, the outside dimension of the first substrate that receives the connection member can be made smaller in comparison with the first substrate having no concave portion. Therefore, the entire module including the second substrate and the optical transmission module can be miniaturized.

Moreover, in the optical transmission module of the present invention that relates to the above-mentioned optical transmission module, the connection member is preferably provided with an electrode to be electrically connected to the second substrate.

In accordance with the above-mentioned arrangement, the connection member is provided with the electrode to be electrically connected to the second electrode. Therefore, the optical transmission module can be electrically connected to the second substrate by connecting the connection member to the second substrate. Since it is not necessary to provide a member used for electrically connecting the optical transmission module to the second substrate in a separate manner, the space on the second substrate can be effectively utilized, and the entire module including the second substrate and the optical transmission module can be miniaturized.

In the optical transmission module of the present invention that relates to the above-mentioned optical transmission module, the first substrate preferably has bending rigidity that is higher than that of the second substrate.

In accordance with the above-mentioned arrangement, the first substrate has bending rigidity that is higher than that of the second substrate; therefore, even in the case where a deformation such as warping occurs in the second substrate due to influences of an external force, the first substrate becomes less susceptible to occurrence of a deformation. Therefore, the positional relationship between the optical element to be mounted on the first substrate and the optical waveguide can be maintained constant so that data transmission can be carried out in a stable manner without fluctuations in the optical coupling efficiency.

Specific embodiments or examples, given in the detailed description of the present invention, are only used for clarifying the technical contents of the present invention, and are not narrowly interpreted in a limited manner to such specific examples, and various modifications may be made therein within the spirit of the present invention and the scope of the following claims.

INDUSTRIAL APPLICABILITY

Since stable data transmission is available by using an flexible optical cable, the module of the present invention is utilized for data transmission among substrates in many fields, such as portable telephones, notebook PCs, PDAs (portable information terminals), liquid crystal TVs, desktop monitors, printers, electric appliances for automobiles, servers, routers, testers, and other consumer appliances and general-use apparatuses.

The invention claimed is:

1. An optical transmission module comprising:
    an optical element that converts an electric signal to an optical signal or converts an optical signal to an electric signal;
    an optical transmission path that optically coupled with the optical element to transmit an optical signal;
    a first substrate that houses the optical element and an incident/releasing port of the optical transmission path for an optical signal;
    a second substrate to which the first substrate is electrically connected; and
    a holding unit having elasticity, which holds the first substrate;
    wherein the holding unit comprises a connection member that is connected to the second substrate,
    wherein the holding unit is provided with an electrode at a connecting position of the connection member to the first substrate,
    wherein the first substrate is electrically connected to the second substrate through the electrode, and
    wherein at least a portion of the first substrate has a bending rigidity that is higher than a bending rigidity of the second substrate.

2. The optical transmission module according to claim 1, wherein the first substrate is provided with a concave portion that receives the connection member.

3. The optical transmission module according to claim 2, wherein the first substrate is formed into a concave shape including a bottom plate that carries the optical element and side walls that rise from the bottom plate in a manner so as to surround the periphery of the optical element, with a concave portion that receives the connection member being formed on a face on the side walls on the opposite side to a face that faces an inner space in the concave portion.

4. An optical transmission module comprising:
    an optical element that converts an electric signal to an optical signal or converts an optical signal to an electric signal;
    an optical transmission path that optically coupled with the optical element to transmit an optical signal;
    a first substrate that houses the optical element and an incident/releasing port of the optical transmission path for an optical signal;
    a second substrate to which the first substrate is electrically connected;
    a holding unit having elasticity, which holds the first substrate; and
    a connection member having a connection unit that is connected to the second substrate,
    wherein the holding unit is provided with an electrode at a connecting position to the first substrate, and wherein the first substrate is electrically connected to the second substrate through the electrode and the connection unit, wherein the first substrate has bending rigidity that is higher than that of the second substrate.

5. An optical transmission module comprising:

an optical element that converts an electric signal to an optical signal or converts an optical signal to an electric signal;

an optical transmission path that optically coupled with the optical element to transmit an optical signal;

a first substrate that houses the optical element and an incident/releasing port of the optical transmission path for an optical signal;

a second substrate to which the first substrate is electrically connected; and a holding unit having elasticity, which holds the first substrate;

wherein the holding unit comprises a connection member that is connected to the second substrate, wherein the holding unit is provided with an electrode at a connecting position of the connection member to the first substrate, wherein the first substrate is electrically connected to the second substrate through the electrode, wherein the first substrate has bending rigidity that is higher than that of the second substrate.

* * * * *